United States Patent
Akavaram et al.

(10) Patent No.: US 12,517,667 B2
(45) Date of Patent: Jan. 6, 2026

(54) HOST MANAGEMENT OF WRITE BUFFER SIZE FOR FLASH MEMORY

(71) Applicant: QUALCOMM Incorporated, San Diego, CA (US)

(72) Inventors: Santhosh Reddy Akavaram, Hyderabad (IN); Chintalapati Bharath Sai Varma, Hyderabad (IN); Prakhar Srivastava, Lucknow (IN); Sai Jitendra Varma Gadiraju, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 154 days.

(21) Appl. No.: 18/481,616

(22) Filed: Oct. 5, 2023

(65) Prior Publication Data

US 2025/0117144 A1    Apr. 10, 2025

(51) Int. Cl.
   G06F 3/06         (2006.01)
(52) U.S. Cl.
   CPC .......... *G06F 3/0631* (2013.01); *G06F 3/0619* (2013.01); *G06F 3/0653* (2013.01); *G06F 3/0679* (2013.01)
(58) Field of Classification Search
   CPC .... G06F 3/0631; G06F 3/0619; G06F 3/0653; G06F 3/0679; G06F 2212/7203; G06F 2212/7206; G06F 12/0246
   See application file for complete search history.

(56) References Cited

U.S. PATENT DOCUMENTS

| | | | | |
|---|---|---|---|---|
| 11,586,385 | B1* | 2/2023 | Lercari | G06F 12/0246 |
| 11,644,986 | B1* | 5/2023 | Lamberts | G06F 12/0871 |
| | | | | 711/118 |
| 2020/0073795 | A1* | 3/2020 | Asano | G06F 3/0656 |
| 2022/0013191 | A1* | 1/2022 | Bhatia | G11C 16/0483 |
| 2022/0236903 | A1* | 7/2022 | Kim | G06F 3/0679 |
| 2023/0058630 | A1* | 2/2023 | Jang | G06F 3/061 |

FOREIGN PATENT DOCUMENTS

EP    2256621 A1    12/2010

OTHER PUBLICATIONS

International Search Report and Written Opinion—PCT/US2024/039804—ISA/EPO—Nov. 11, 2024.
JEDEC: "Universal Flash Storage (UFS) Version 4.0", JESD220F (Revision of JESD220E, Jan. 2020), JEDEC Solid State Technology Association, Aug. 2022, 489 Pages.

* cited by examiner

*Primary Examiner* — Hiep T Nguyen
(74) *Attorney, Agent, or Firm* — Moore IP

(57) ABSTRACT

A host device includes a host controller interface (HCI) configured to be coupled to a flash memory device (FMD). The HCI is configured to obtain an indication that a size of a particular write buffer (WB) of the FMD is to be increased. The FMD includes a plurality of memory resources that include a plurality of logical units (LUs) and at least the particular WB. The HCI is also configured to select a particular memory resource for write buffer reallocation based at least in part on a particular usage metric of the particular memory resource.

28 Claims, 15 Drawing Sheets

HOST MANAGEMENT OF WRITE BUFFER SIZE FOR FLASH MEMORY

I. FIELD

The present disclosure is generally related to host management of write buffer size of a flash memory device.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to operate as a host device that can store and retrieve data from a flash memory device. For example, the host device can store audio, an image, a video, a document, etc. on the flash memory device. The flash memory device can use a write buffer as a temporary storage area for incoming data writes from the host device before the data is written to main memory cells. Using the write buffer has various advantages, such as reducing write latency perceived by the host device. When the write buffer is smaller, the write buffer can often become unavailable as the write buffer gets filled to capacity and data is flushed to the main memory cells. On the other hand, a larger write buffer takes up more memory that could have been used as main memory instead. Usage of the write buffer changes dynamically, so a fixed size of the write buffer can be too small when larger or frequent writes are being performed and can be too large when fewer and smaller writes are being performed.

III. SUMMARY

According to one implementation of the present disclosure, a host device includes a host controller interface (HCI) configured to be coupled to a flash memory device (FMD) and configured to obtain an indication that a size of a particular write buffer (WB) of the FMD is to be increased. The FMD includes a plurality of memory resources that include a plurality of logical units (LUs) and at least the particular WB. The HCI is also configured to select a particular memory resource for write buffer reallocation based at least in part on a particular usage metric of the particular memory resource.

According to another implementation of the present disclosure, a method includes obtaining, at a host controller interface (HCI), an indication that a size of a particular write buffer (WB) of a flash memory device (FMD) is to be increased. The FMD includes a plurality of memory resources that include a plurality of logical units (LUs) and at least the particular WB. The method also includes selecting, at the HCI, a particular memory resource for write buffer reallocation based at least in part on a particular usage metric of the particular memory resource.

According to another implementation of the present disclosure, a non-transitory computer-readable medium is configured to store instructions that, when executed by one or more processors, cause the one or more processors to obtain, at a host controller interface (HCI), an indication that a size of a particular write buffer (WB) of a flash memory device (FMD) is to be increased. The FMD includes a plurality of memory resources that include a plurality of logical units (LUs) and at least the particular WB. The instruction further cause the one or more processors to select a particular memory resource for write buffer reallocation based at least in part on a particular usage metric of the particular memory resource.

According to another implementation of the present disclosure, an apparatus includes means for obtaining, at a host controller interface (HCI), an indication that a size of a particular write buffer (WB) of a flash memory device (FMD) is to be increased. The FMD includes a plurality of memory resources that include a plurality of logical units (LUs) and at least the particular WB. The apparatus also includes means for selecting a particular memory resource for write buffer reallocation based at least in part on a particular usage metric of the particular memory resource.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
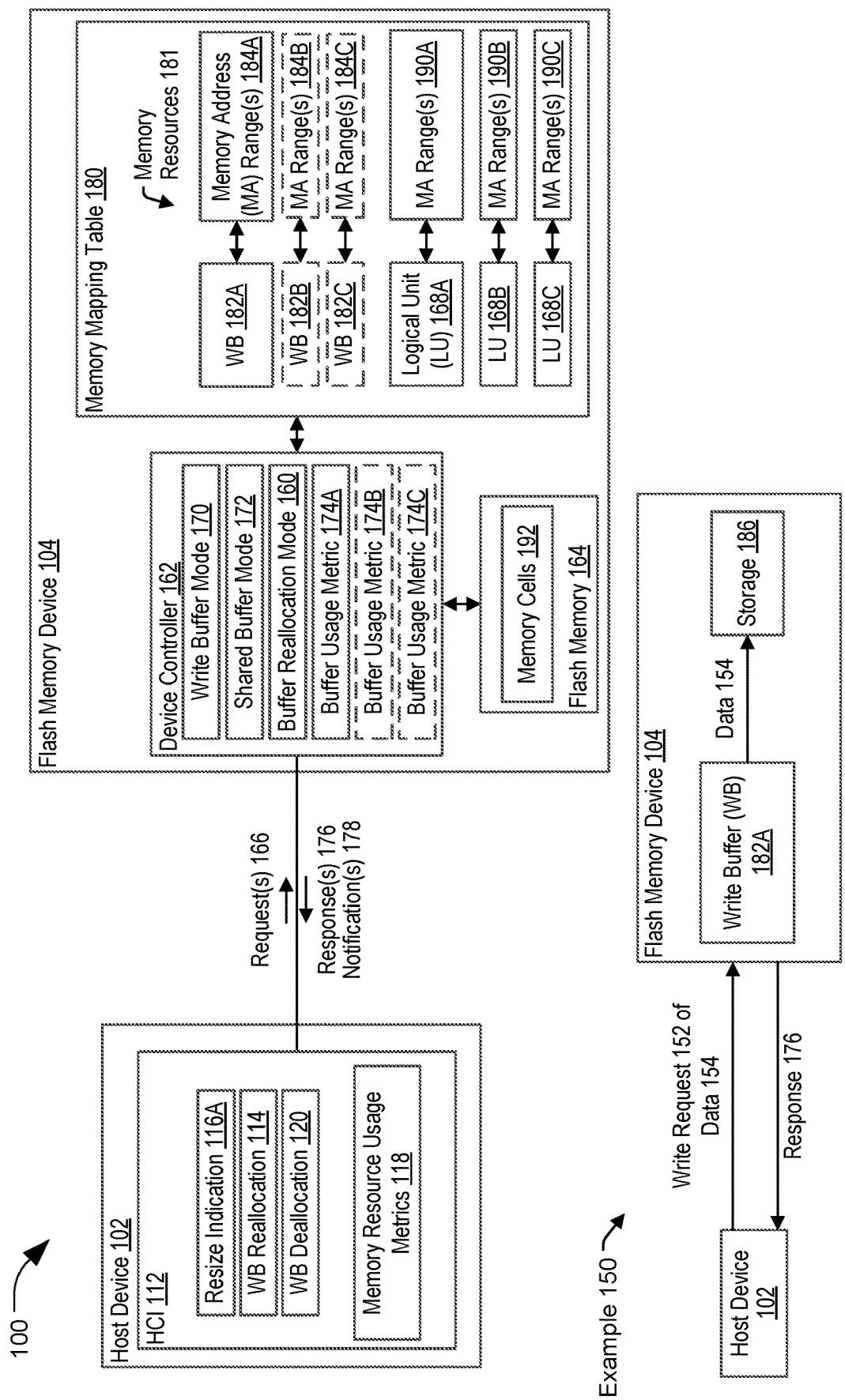
FIG. 1 is a block diagram of a particular illustrative aspect of a system operable to perform host management of write buffer size for flash memory, in accordance with some examples of the present disclosure.

Computing devices often incorporate functionality to store and retrieve data from a flash memory device. For example, a host device can store audio, an image, a video, a document, etc. on the flash memory device. The flash memory device includes main memory cells of a first memory type (e.g., triple-level cell (TLC)) that are used to store the data. The flash memory device can also include one or more write buffers with memory cells of a second memory type (e.g., single-level cell (SLC)). In some examples, memory cells of the first memory type can store more data whereas writing to memory cells of the second memory type is faster, so memory cells of the first memory type are used as main memory cells to increase storage capacity and memory cells of the second memory type are used as write buffers to reduce write latency. A memory cell can be converted from the first memory type to the second memory type, and vice versa.

The main memory is divided into logical units for various purposes, such as wear leveling and managing different types of memory usage. Typically, when a write buffer is filled to capacity, writing to the write buffer is disabled while data from the write buffer is written to main memory cells of respective logical units. If a write buffer gets filled frequently, writing to the write buffer has to be disabled frequently. On the other hand, having a write buffer that has large unused capacity can be a waste of resources because some of the memory cells that are assigned to the write buffer could instead have been used as main memory cells.

Systems and methods of performing host management of write buffer size for flash memory are disclosed. The flash memory device includes memory resources such as a plurality of logical units and at least one write buffer. The flash memory device maintains usage metrics of the memory resources. For example, a buffer usage metric of a particular write buffer indicates usage of the particular write buffer. As another example, a logical unit usage metric of a particular logical unit indicates usage of the particular logical unit.

In some examples, the host device obtains an indication that a size of a particular write buffer is to be increased. In an example, an exception is generated at the flash memory device when a buffer usage metric of the particular write buffer indicates usage that exceeds a high usage threshold, and the flash memory device sends a notification to the host device that a size of the particular buffer is to be increased. In another example, the host device sends a request to the flash memory device for a buffer usage metric of the particular write buffer, and determines that a size of the particular write buffer is to be increased in response to determining that the buffer usage metric indicates usage that exceeds the high usage threshold.

The host device, based on determining that a size of the particular write buffer is to be increased, selects a particular memory resource for write buffer reallocation based at least in part on a usage metric of the particular memory resource. In a first example, the host device selects a particular logical unit based on determining that a usage metric of the particular logical unit indicates lowest usage among the plurality of logical units. In a second example, the host device selects a second write buffer based on determining that a usage metric of the second write buffer indicates lowest usage among the plurality of write buffers.

The host device reallocates a portion of the selected memory resource to the particular write buffer. In the first example, the host device sends a request to the flash memory device indicating that the particular logical unit is to be used for reallocation to the particular write buffer. The flash memory device, in response to receiving the request, converts a portion of the particular logical unit from the first memory type (e.g., TLC) to the second memory type (e.g., SLC) and assigns the portion of the particular logical unit to the particular write buffer. In the second example, the host device sends a request to the flash memory device indicating that the second write buffer is to be used for reallocation to the particular write buffer. The flash memory device, in response to receiving the request, reallocates a portion of the second write buffer to the particular write buffer.

In some examples, the host device obtains an indication that a size of a particular write buffer is to be decreased. In an example, an exception is generated at the flash memory device when the buffer usage metric indicates usage lower than a low usage threshold, and the flash memory device sends a notification to the host device that a size of the particular buffer is to be decreased. In another example, the host device sends a request to the flash memory device to obtain a buffer usage metric of the particular write buffer, and determines that a size of the particular write buffer is to be decreased in response to determining that the buffer usage metric indicates usage lower than the low usage threshold.

The host device, in response to determining that the size of the particular write buffer is to be decreased, sends a request to the flash memory device to deallocate a portion of the particular write buffer. The flash memory device, in response to receiving the request, deallocates a portion of the particular write buffer. In some examples, the flash memory device can reallocate the portion of the particular write buffer to one or more logical units, one or more other write buffers, or a combination thereof. A technical advantage of dynamically resizing the write buffer based on write buffer usage enables increasing write buffer availability while conserving write buffer memory allocation.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a memory mapping table 180 that indicates that a write buffer 182A corresponds to one or more memory address ranges ("memory address range(s)" 184A of FIG. 1), which indicates that in some aspects the write buffer 182A corresponds to a single memory address range 184A (e.g., a contiguous memory range) and in other aspects the write buffer 182A corresponds to multiple memory address ranges 184A (e.g., non-contiguous memory ranges). For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple logical units are illustrated and associated with reference numbers 168A, 168B, and 168C. When referring to a particular one of these logical units, such as a logical unit 168A, the distinguishing letter "A" is used. However, when referring to any arbitrary one of these logical units or to these logical units as a group, the reference number 168 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect is shown of a system 100 that is configured to perform host management of write buffer size for flash memory. The system 100 includes a host device 102 that is configured to be coupled to a flash memory device 104.

The flash memory device 104 includes a device controller 162 that is coupled to a flash memory 164 (e.g., NAND memory) that includes memory cells 192. The device controller 162 has access to a memory mapping table 180. For example, the memory mapping table 180 is stored in a portion of the flash memory 164 or a static random access memory (SRAM) coupled to the device controller 162. In some implementations, the memory mapping table 180 corresponds to a logical-to-physical address mapping table.

The memory mapping table 180 is configured to indicate memory cells of the flash memory 164 that are assigned to one or more write buffers 182. For example, the memory mapping table 180 indicates that a write buffer 182A corresponds to one or more memory address ranges 184A. In some implementations, the memory mapping table 180 indicates that a write buffer 182B corresponds to one or more memory address ranges 184B, a write buffer 182C corresponds to the one or more memory address ranges 184C, one or more additional write buffers correspond to respective memory address range(s), or a combination thereof. Each particular memory address range 184 indicates a corresponding subset of the memory cells 192, such as one or more ranges of physical addresses of the corresponding subset of the memory cells 192.

The memory mapping table 180 is also configured to indicate memory cells of the flash memory 164 that are assigned to logical units 168. For example, the memory mapping table 180 indicates that a logical unit 168A corresponds to one or more memory address ranges 190A, a logical unit 168B corresponds to one or more memory address ranges 190B, a logical unit 168C corresponds to one or more memory address ranges 190C, one or more additional logical units correspond to respective memory address range(s), or a combination thereof. Each particular memory address range 190 indicates a corresponding subset of the memory cells 192, such as one or more ranges of physical addresses of the corresponding subset of the memory cells 192.

In a particular aspect, each of a first subset of the memory cells 192 that is assigned to the logical units 168 has a first memory type (e.g., triple-level cell (TLC)), and each of a second subset of the memory cells 192 that is assigned to a write buffer 182 has a second memory type (e.g., single-level cell (SLC)). In a particular aspect, memory cells of the first memory type can store more data, whereas memory cells of the second memory type correspond to lower write latency.

The device controller 162 is configured to convert a memory cell 192 from the first memory type to the second memory type, and vice versa. For example, the device controller 162, prior to reallocating a memory cell from a logical unit 168 to a write buffer 182, converts the memory cell from the first memory type (e.g., TLC) to the second memory type (e.g., SLC). As another example, the device controller 162, prior to reallocating a memory cell from a write buffer 182 to a logical unit 168, converts the memory cell from the second memory type (e.g., SLC) to the first memory type (e.g., TLC).

The device controller 162 is configured to perform write operations to the flash memory 164 in accordance with one or more buffer modes. For example, the one or more buffer modes include a write buffer mode 170, which indicates whether the flash memory device 104 is configured to use one or more write buffers 182 as temporary storage for the logical units 168. For example, when the write buffer mode 170 is enabled, one or more write buffers 182 are available and are to be used as temporary storage for data writes to the logical units 168.

In an example, the one or more buffer modes includes a shared buffer mode 172, which indicates whether a shared write buffer or dedicated write buffers are to be used. For example, when the write buffer mode 170 and the shared buffer mode 172 are both enabled, a write buffer 182A is available and is to be used as temporary storage for data writes across the logical units 168. When the write buffer mode 170 is enabled and the shared buffer mode 172 is disabled, dedicated write buffers are available and are to be used as temporary storage for data writes to respective logical units 168. For example, a write buffer 182A is to be used as temporary storage for data writes to a logical unit 168A, a write buffer 182B is to be used as temporary storage for data writes to a logical unit 168B, a write buffer 182C is to be used as temporary storage for data writes to a logical unit 168C, and so on.

According to some implementations, the one or more buffer modes include a buffer reallocation mode 160 which indicates whether an increase in a size of a write buffer 182 is to be performed by reallocating a portion of another write buffer, as further described with reference to FIGS. 7-9 or by reallocation of a portion of a logical unit, as further described with reference to FIGS. 3-6. For example, when dedicated write buffers are available and the buffer reallocation mode 160 is enabled, an increase in a size of a write buffer 182A is to be performed by reallocating a portion of a write buffer 182B to the write buffer 182A, as further described with reference to FIGS. 7-9. As another example, when the write buffer 182A is a shared write buffer for the logical units 168 or when dedicated write buffers are available and the buffer reallocation mode 160 is disabled, an increase in the size of the write buffer 182A is to be performed by reallocating a portion of a logical unit 168 to the write buffer 182A, as further described with reference to FIGS. 3-6.

In a particular aspect, the one or more buffer modes (e.g., the write buffer mode 170, the shared buffer mode 172, the buffer reallocation mode 160, or a combination thereof) are set based on default data, a configuration setting, a user input, a command from the HCI 112, or a combination thereof. In a particular aspect, one or more indicators of the one or more buffer modes are stored in a portion of the flash memory 164, a register, or another type of data storage, or a combination thereof. In a particular aspect, one or more indicators of the one or more buffer modes are stored at the host device 102.

It should be understood that operations based on the one or more buffer modes (e.g., the write buffer mode 170, the shared buffer mode 172, the buffer reallocation mode 160, or a combination thereof) are described herein as illustrative examples. In some implementations, one or more of the write buffer mode 170, the shared buffer mode 172, the buffer reallocation mode 160, or a combination thereof are optional. In some examples, one or more of the operations described herein can be performed based on one or more other parameters or combinations of parameters.

According to some optional implementations, the flash memory device 104 may support fewer than the one or more buffer modes (e.g., the write buffer mode 170, the shared buffer mode 172, the buffer reallocation mode 160, or a combination thereof) described herein. For example, in some implementations, the flash memory device 104 is configured to have a shared write buffer and does not support dedicated write buffers. In these implementations, the flash memory device 104 may not include the shared buffer mode 172, and one or more operations are performed as if the shared buffer mode 172 is enabled. Alternatively, in some implementations, the flash memory device 104 is configured to have dedicated write buffers and does not support a shared write buffer. In these implementations, the flash memory device 104 may not include the shared buffer mode 172, and one or more operations are performed as if the shared buffer mode 172 is disabled.

In some implementations, the flash memory device 104 supports buffer reallocation and does not support reallocation from a logical unit. In these implementations, the flash memory device 104 may not have the buffer reallocation mode 160, and one or more operations are performed as if the buffer reallocation mode 160 is enabled. Alternatively, in some implementations, the flash memory device 104 supports reallocation from a logical unit and does not support buffer reallocation. In these implementations, the flash memory device 104 may not have the buffer reallocation mode 160, and one or more operations are performed as if the buffer reallocation mode 160 is disabled.

The device controller 162 is configured to maintain one or more buffer usage metrics 174. For example, the device controller 162 is configured to maintain a buffer usage metric 174A indicating usage of the write buffer 182A. According to some implementations, the device controller 162 is also configured to maintain a buffer usage metric 174B of the write buffer 182B, a buffer usage metric 174C of the write buffer 182C, one or more additional buffer usage metrics of one or more additional write buffers, or a combination thereof. In a particular aspect, the device controller 162 is coupled to, or includes, one or more registers configured to store the one or more buffer usage metrics 174.

In a particular aspect, the device controller 162 maintains the one or more buffer usage metrics 174 when the write buffer mode 170 is enabled. For example, the device controller 162 refrains from updating the one or more buffer usage metrics 174 when the write buffer mode 170 is disabled.

The host device 102 includes a host controller interface (HCI) 112 that is configured to be coupled to the flash memory device 104. In an example, the HCI 112 is configured to communicate with the device controller 162 of the flash memory device 104. According to some implementations, the HCI 112 is configured to send one or more requests 166 to the device controller 162, and the device controller 162 is configured to send a response 176 to the HCI 112 responsive to receiving a request 166 from the HCI 112.

The HCI 112 is configured to obtain a resize indication 116A based on a comparison of the buffer usage metric 174A and one or more thresholds. In some examples, the HCI 112 is configured to obtain the resize indication 116A when the write buffer mode 170 is enabled. In these examples, the HCI 112 refrains from obtaining the resize indication 116A when the write buffer mode 170 is disabled.

According to some implementations, the HCI 112 is configured to send a request 166 to the flash memory device 104 and the device controller 162 is configured to send a response 176 to the host device 102 indicating the buffer usage metric 174A, as further described with reference to FIGS. 2A and 2B. In these implementations, the HCI 112 is configured to perform the comparison of the buffer usage metric 174A and one or more thresholds to obtain the resize indication 116A. According to some implementations, the device controller 162 is configured to generate a notification 178 based on a comparison of the buffer usage metric 174A and one or more thresholds. In these implementations, the HCI 112 is configured to obtain the resize indication 116A based on receiving the notification 178, as further described with reference to FIG. 2C.

In some examples, the device controller 162 is configured to generate the notification 178 when the write buffer mode 170 is enabled. In these examples, the device controller 162 is configured to refrain from generating the notification 178 when the write buffer mode 170 is disabled.

The resize indication 116A indicates whether a size of the write buffer 182A is to be increased, decreased, or remain unchanged. The HCI 112 is configured to, in response to determining that the resize indication 116A indicates that the size of the write buffer 182A is to be increased, select a memory resource 181 (e.g., another write buffer or a logical unit) based on a memory resource usage metric 118 and perform a write buffer reallocation 114 to reallocate a portion of the selected memory resource 181 to the write buffer 182A, as further described with reference to FIGS. 3-9. Alternatively, the HCI 112 is configured to, in response to determining that the resize indication 116A indicates that the size of the write buffer 182A is to be decreased, perform a write buffer deallocation 120 to deallocate a portion of the write buffer 182A, as further described with reference to FIG. 10.

In some examples, the HCI 112 is configured to adjust a size of the write buffer 182A when the write buffer mode 170 is enabled. In these examples, the HCI 112 refrains from adjusting the size of the write buffer 182A when the write buffer mode 170 is disabled.

During operation, the device controller 162 maintains buffer usage metrics 174 while the write buffer mode 170 is enabled. For example, the device controller 162 updates the buffer usage metric 174A based on usage of the write buffer 182A. To illustrate, the buffer usage metric 174A indicates a count of full buffer detections of the write buffer 182A. The device controller 162 initializes the buffer usage metric 174A to an initial value (e.g., 0) and updates the buffer usage metric 174A in response to detecting that the write buffer 182A has reached full capacity and that data stored in the write buffer 182A is to be flushed to corresponding logical units 168. In some aspects, the device controller 162, responsive to resizing the write buffer 182A, resets the buffer usage metric 174A to the initial value (e.g., 0).

An example 150 depicts a write operation using the write buffer 182A. The host device 102 (e.g., the HCI 112) sends a write request 152 to the flash memory device 104. In a particular aspect, the write request 152 indicates that data 154 is to be stored at a particular memory location of the logical unit 168A. The flash memory device 104 (e.g., the device controller 162), based on determining that the write buffer mode 170 is enabled, stores the data 154 in the write buffer 182A and sends a response 176 to the host device 102 indicating that the write is successful.

According to some implementations, the flash memory device 104, in response to determining that the write buffer mode 170 is enabled, that the shared buffer mode 172 is enabled, and that the write buffer 182A corresponds to a shared write buffer, stores the data 154 in the write buffer 182A. Alternatively, the flash memory device 104, in response to determining that the write buffer mode 170 is enabled, that the shared buffer mode 172 is disabled, and that the write buffer 182A corresponds to a dedicated write buffer of the logical unit 168A, stores the data 154 in the write buffer 182A. Writing to the write buffer 182A can be faster than writing to the logical unit 168A, thereby reducing a latency between the host device 102 sending the data 154 to the flash memory device 104 and receiving the response 176.

At a later time, the flash memory device 104 (e.g., the device controller 162) stores the data 154 to storage 186. For example, the storage 186 includes the logical units 168, and the flash memory device 104 writes the data 154 from the write buffer 182A to the particular memory location of the logical unit 168A. In a particular aspect, the flash memory device 104 writes the data 154 to the logical unit 168A as part of performing a flush of data from the write buffer 182A to the storage 186. For example, the flash memory device 104 (e.g., the device controller 162), based at least in part on determining that the write buffer 182A is filled to capacity, updates (e.g., increments by 1) the buffer usage metric 174A and performs a flush of data from the write buffer 182A to the storage 186.

In some implementations, the device controller 162 maintains logical unit usage metrics of the logical units 168. In these implementations, the device controller 162 updates the logical unit usage metrics responsive to writing data from the write buffer 182A to one or more of the logical units 168, as further described with reference to FIG. 3. The HCI 112 obtains logical unit usage metrics of the logical units 168, as further described with reference to FIG. 3. For example, the HCI 112 receives the logical unit usage metrics from the device controller 162. As another example, the HCI 112 maintains a local copy of the logical unit usage metrics. To illustrate, the HCI 112 updates a logical unit usage metric of the logical unit 168A based on receiving the response 176 indicating that the write of data 154 to the logical unit 168A is successful.

The HCI 112 obtains a resize indication 116A indicating whether a size of the write buffer 182A is to be increased, decreased, or unchanged. According to some implementations, the HCI 112 sends a request 166 (e.g., a buffer usage metric request) to the flash memory device 104 and receives the buffer usage metric 174A from the device controller 162 in a response 176 and compares the buffer usage metric 174A to one or more thresholds to obtain the resize indication 116A, as further described with reference to FIGS. 2A-2B. In alternative implementations, the device controller 162 generates a notification 178 based on a comparison of the buffer usage metric 174A to one or more thresholds, and the HCI 112 obtains the resize indication 116A based on receiving the notification 178, as further described with reference to FIG. 2C. In some aspects, the device controller 162 generates the notification 178, the HCI 112 obtains the resize indication 116A, or both, when the write buffer mode 170 is enabled.

The HCI 112, in response to determining that the resize indication 116A indicates that a size of the write buffer 182A is to be increased, performs a write buffer reallocation 114. For example, the HCI 112 selects a particular memory resource 181 based on memory resource usage metrics 118 of the memory resources 181, as further described with reference to FIGS. 3-9. For example, the HCI 112, in response to determining that the write buffer mode 170 is enabled and the shared buffer mode 172 is enabled, indicating that the write buffer 182A is in use as a shared write buffer, determines that one of the logical units 168 is to be selected as a memory resource 181 for write buffer reallocation 114, as further described with reference to FIGS. 3-4. In another example, the HCI 112, in response to determining that the write buffer mode 170 is enabled, the shared buffer mode 172 is disabled, and the buffer reallocation mode 160 is disabled, indicating that dedicated write buffers are in use and portions from write buffers are not to be reallocated to other write buffers, determines that one of the logical units 168 is to be selected as a memory resource 181 for write buffer allocation 114, as further described with reference to FIGS. 3 and 5. The HCI 112, in response to determining that one of the logical units 168 is to be selected as the memory resource 181 for write buffer reallocation 114, selects a particular logical unit 168 based on determining that the particular logical unit 168 has a logical unit usage metric that indicates lowest usage among the logical units 168, as further described with reference to FIGS. 3-6.

Figure 7:
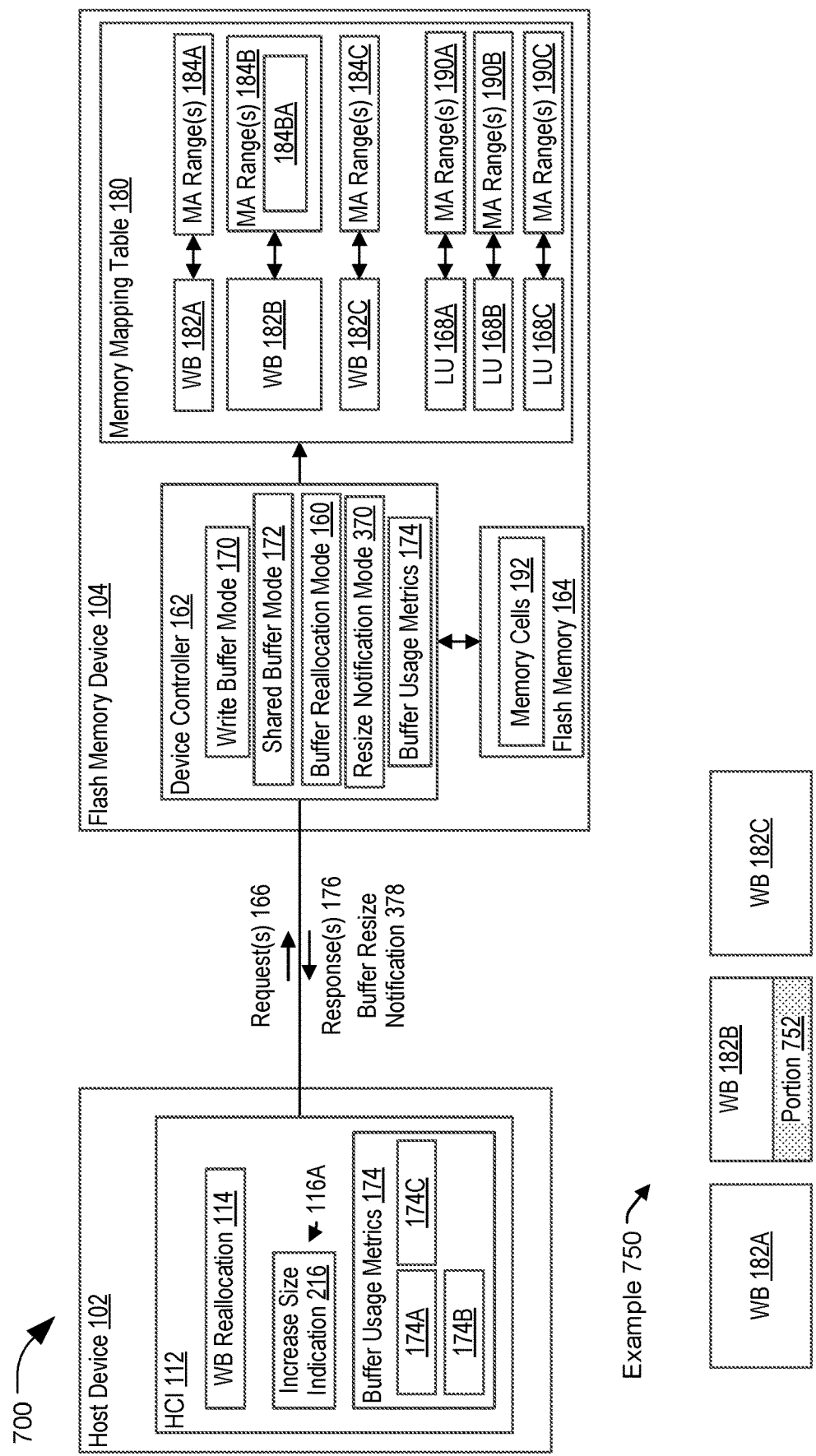
FIG. 7 is a diagram of another illustrative aspect of write buffer allocation that can be performed by the system of FIG. 1, in accordance with some examples of the present disclosure.
Figure 8:
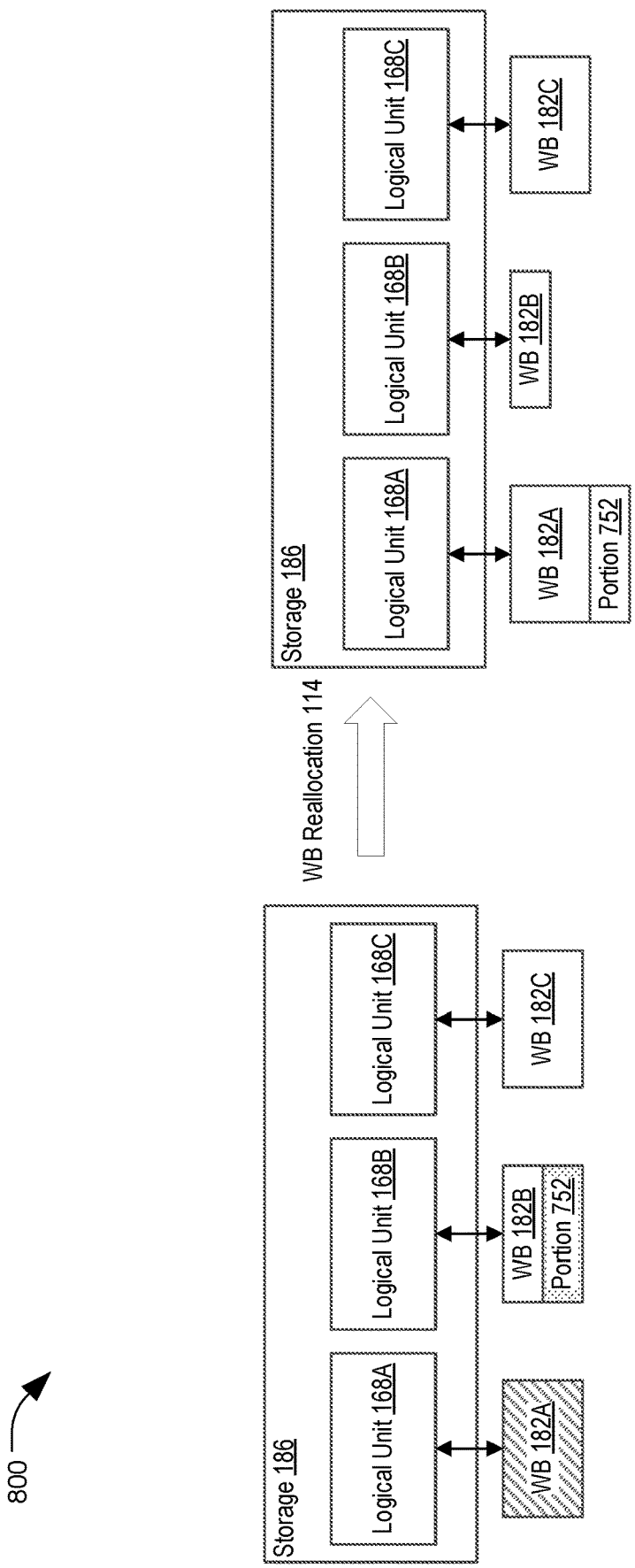
FIG. 8 is a diagram of an illustrative aspect of performing the write buffer allocation of FIG. 7 for a dedicated write buffer, in accordance with some examples of the present disclosure.
Figure 9:
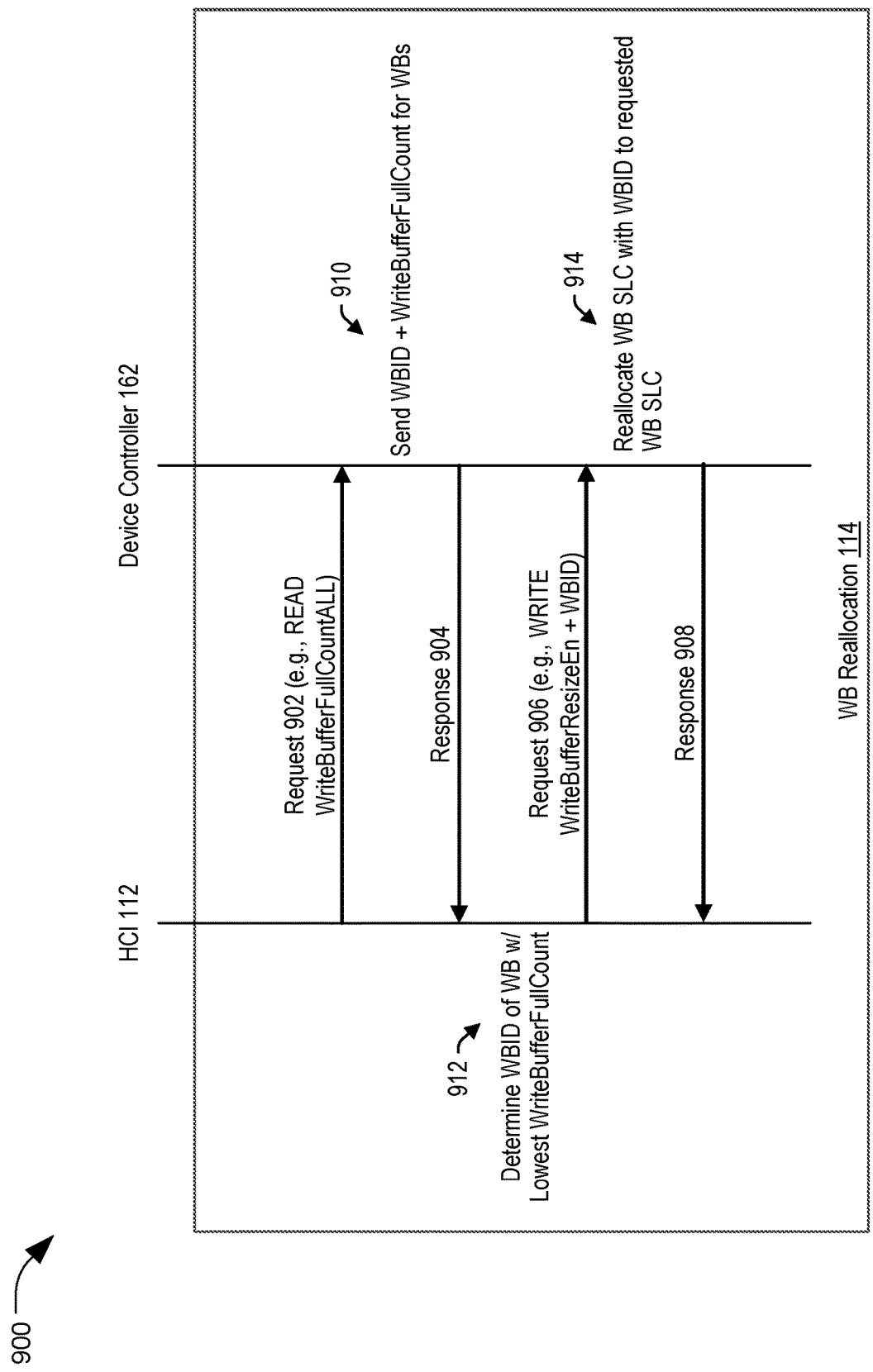
FIG. 9 is a ladder diagram of an illustrative aspect of operations associated with the write buffer allocation of FIG. 7, in accordance with some examples of the present disclosure.

In a particular example, the HCI 112, in response to determining that the write buffer mode 170 is enabled, the shared buffer mode 172 is disabled, and the buffer reallocation mode 160 is enabled, indicating that dedicated write buffers are in use and portions of write buffers are to be reallocated to increase the size of other write buffers, determines that one of the write buffers 182 is to be selected as a memory resource 181 for the write buffer reallocation 114, as further described with reference to FIGS. 7-9. The HCI 112, in response to determining that one of the write buffers 182 is to be selected as the memory resource 181 for write buffer reallocation 114, selects a particular write buffer 182 based on determining that the particular write buffer 182 has a buffer usage metric that indicates lowest usage among the write buffers 182.

The HCI 112 sends a request 166 indicating that the particular memory resource 181 is to be used for write buffer reallocation 114 to the write buffer 182A. The device controller 162, in response to receiving the request 166, allocates one or more portions of the particular memory resource 181 to the write buffer 182A, as further described with reference to FIGS. 3-9. For example, the device controller 162 updates the memory mapping table 180 to indicate that the one or more portions are deallocated from the particular memory resource 181 and allocated to the write buffer 182A. According to some implementations, the device controller 162 sends a response 176 to the HCI 112 indicating that the write buffer reallocation 114 is successful.

In a particular aspect, the HCI 112, in response to determining that the resize indication 116A indicates that a size of the write buffer 182A is to be decreased, performs a write buffer deallocation 120, as further described with reference to FIG. 10. For example, the HCI 112 sends a request 166 indicating that the write buffer deallocation 120 is to be performed on the write buffer 182A. The device controller 162, in response to receiving the request 166, deallocates one or more portions of the write buffer 182A. For example, the device controller 162 updates the memory mapping table 180 to indicate that the one or more portions are deallocated from the write buffer 182A. In some aspects, the device controller 162 sends a response 176 to the HCI 112 indicating that the write buffer deallocation 120 is successful.

In some aspects, the device controller 162 resets the buffer usage metric 174A in response to performing the write buffer reallocation 114 or the write buffer deallocation 120. According to some implementations, the device controller 162 reallocates the one or more portions that are deallocated from the write buffer 182A to one or more of the memory resources 181 (other than the write buffer 182A). For example, the device controller 162 selects the one or more of the memory resources 181 based on the memory resource usage metrics 118 (e.g., the buffer usage metrics 174, the logical unit usage metrics, or a combination thereof).

The device controller 162 updates a usage metric of any memory resource that is resized. For example, the device controller 162 resets (e.g., to 0) a buffer usage metric 174 of any write buffer 182 that is resized. In a particular aspect, the device controller 162 recalculates a logical unit usage metric of any logical unit 168 that is resized, as further described with reference to FIG. 3.

A technical advantage of resizing a write buffer 182A based on a buffer usage metric 174A includes dynamic sizing of the write buffer 182A that is responsive to changes in usage. For example, more memory space can be allocated to the write buffer 182A when usage of the write buffer 182A is above a high usage threshold to reduce a frequency of the write buffer 182A reaching full capacity and becoming unavailable for additional data writes until a flush of the write buffer 182A is performed. Alternatively, less memory space can be allocated to the write buffer 182A when usage of the write buffer 182A is below a low usage threshold to have more memory space available for other uses.

It should be understood that the particular order of operations in the above example(s), or in other examples described herein, is provided for purposes of illustration and not of limitation. In other examples, two or more operations can be performed in another order. In some examples, the device controller 162 can push information to the host device 102. To illustrate, the device controller 162 provides the memory resource usage metrics 118, a notification 178, or both, to the host device 102 independently of the HCI 112 sending a request. In some examples, the HCI 112 can pull information from the flash memory device 104. To illustrate, the device controller 162 provides the one or more buffer usage metrics 174, the memory resource usage metrics 118, or a combination thereof, to the host device 102 in response to receiving one or more requests 166 from the host device 102. In some examples, the HCI 112 can maintain information locally. To illustrate, the HCI 112 can maintain the memory resource usage metrics 118 and has access to the memory resource usage metrics 118 when the notification 178 is received.

Figure 2A:
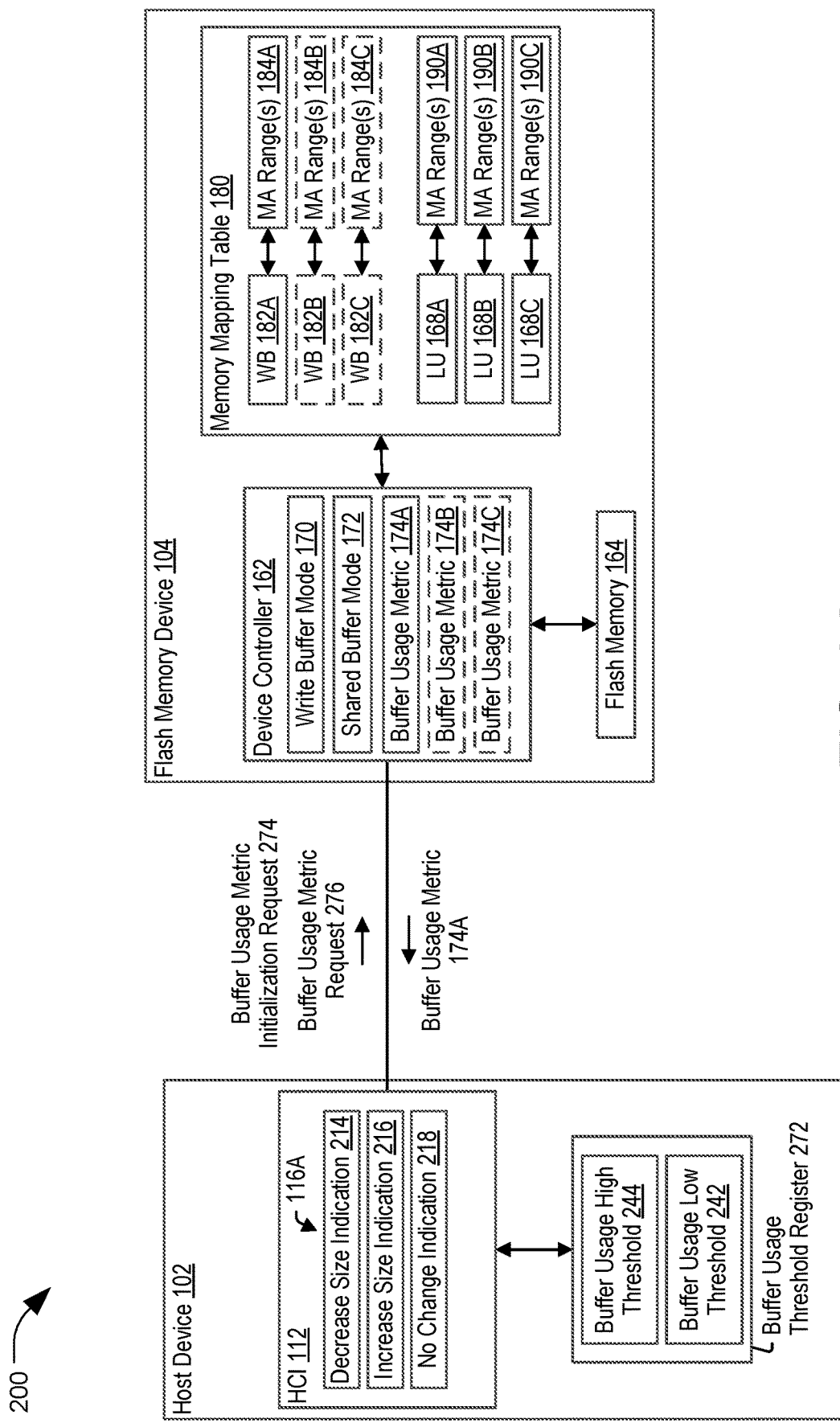
FIG. 2A is a diagram of a particular illustrative aspect of obtaining a resize indication that can be performed by the system of FIG. 1, in accordance with some examples of the present disclosure.

Referring to FIG. 2A, a diagram 200 is shown of a particular illustrative aspect of obtaining a resize indication that can be performed by the system 100 of FIG. 1. The host device 102 includes a buffer usage threshold register 272 coupled to the HCI 112.

The buffer usage threshold register 272 is configured to store a buffer usage low threshold 242, a buffer usage high threshold 244, or both. In an example, the buffer usage threshold register 272 has a particular size (e.g., 16 bits). A first half (e.g., bits 0 to 7) of the buffer usage threshold register 272 is used to store the buffer usage low threshold 242 and a second half (e.g., bits 8 to 15) of the buffer usage threshold register 272 is used to store the buffer usage high threshold 244.

It should be understood that the buffer usage threshold register 272 storing the buffer usage low threshold 242, the buffer usage high threshold 244, or both, is provided as an illustrative example. In other examples, the buffer usage threshold register 272 can be included in the HCI 112, or another type of data storage coupled to (or included in) the HCI 112 can be used to store the buffer usage low threshold 242, the buffer usage high threshold 244, or both. In a particular aspect, the buffer usage low threshold 242, the buffer usage high threshold 244, or both, are based on user input, default data, a configuration setting, or a combination thereof.

According to some implementations, the HCI 112 sends a buffer usage metric initialization request 274 to the device controller 162 to initialize the one or more buffer usage metrics 174. The device controller 162, in response to receiving the buffer usage metric initialization request 274, sets each of the one or more buffer usage metrics 174 to an initial value (e.g., 0) and monitors full detections of the one or more write buffers 182 to update the one or more buffer usage metrics 174 when the write buffer mode 170 is enabled. For example, the device controller 162, in response to detecting that a write buffer 182A has reached full capacity and data from the write buffer 182A is to be flushed to corresponding ones of the logical units 168, updates (e.g., increments by 1) the buffer usage metric 174A of the write buffer 182A. The buffer usage metric 174A thus indicates a count of full buffer detections of the write buffer 182A.

The HCI 112 can periodically or at various times send a buffer usage metric request 276 (e.g., a write booster buffer full count READ instruction or a write booster buffer full count ALL READ instruction) to the device controller 162. In some implementations, when the shared buffer mode 172 is enabled, a write booster buffer full count READ instruction corresponds to a request for the buffer usage metric of the single shared write buffer. When the shared buffer mode 172 is disabled (e.g., a dedicated buffer mode is enabled), a write booster buffer full count READ instruction specifically identifies one or more dedicated write buffers for which buffer usage metrics are requested. A write booster buffer full count ALL READ instruction corresponds to a request for buffer usage metrics of all write buffers, such as the single share write buffer when the shared buffer mode 172 is enabled or all of the dedicated write buffers when the shared buffer mode 172 is disabled. When the shared buffer mode 172 is enabled, the write booster buffer full count ALL READ instruction thus corresponds to the write booster buffer full count READ instruction.

The device controller 162, in response to receiving the buffer usage metric request 276, sends the buffer usage metric 174A of the write buffer 182A to the host device 102. In some implementations, the device controller 162, in response to determining that the buffer usage metric request 276 (e.g., a write booster buffer full count READ instruction) indicates that buffer usage of the write buffer 182A is requested, sends the buffer usage metric 174A to the host device 102. Alternatively, the write buffer 182A corresponds to a shared write buffer (e.g., a single write buffer) and the device controller 162, in response to receiving the buffer usage metric request 276 (e.g., a write booster buffer full count READ instruction or a write booster buffer full count ALL READ instruction), sends the buffer usage metric 174A to the host device 102.

The HCI 112 compares the buffer usage metric 174A to the buffer usage low threshold 242, the buffer usage high threshold 244, or both, to obtain the resize indication 116A. In a particular aspect, the buffer usage low threshold 242 corresponds to a lower limit of usage that triggers a write buffer resize. For example, the HCI 112, in response to determining that the buffer usage metric 174A is less than the buffer usage low threshold 242, generates a decrease size indication 214 as the resize indication 116A indicating that a size of the write buffer 182A is to be decreased.

In a particular aspect, the buffer usage high threshold 244 corresponds to an upper limit of usage that triggers a write buffer resize. For example, the HCI 112, in response to determining that the buffer usage metric 174A is greater than the buffer usage high threshold 244, generates an increase size indication 216 as the resize indication 116A indicating that a size of the write buffer 182A is to be increased. In another example, the HCI 112, in response to determining that the buffer usage metric 174A is greater than or equal to the buffer usage low threshold 242 and less than or equal to the buffer usage high threshold 244, generates a no change indication 218 as the resize indication 116A indicating that a size of the write buffer 182A is to remain unchanged.

The HCI 112 can thus obtain the buffer usage metric 174A of the write buffer 182A and perform a comparison of the buffer usage metric 174A to the buffer usage low threshold 242, the buffer usage high threshold 244, or both, to generate the resize indication 116A.

Figure 2B:
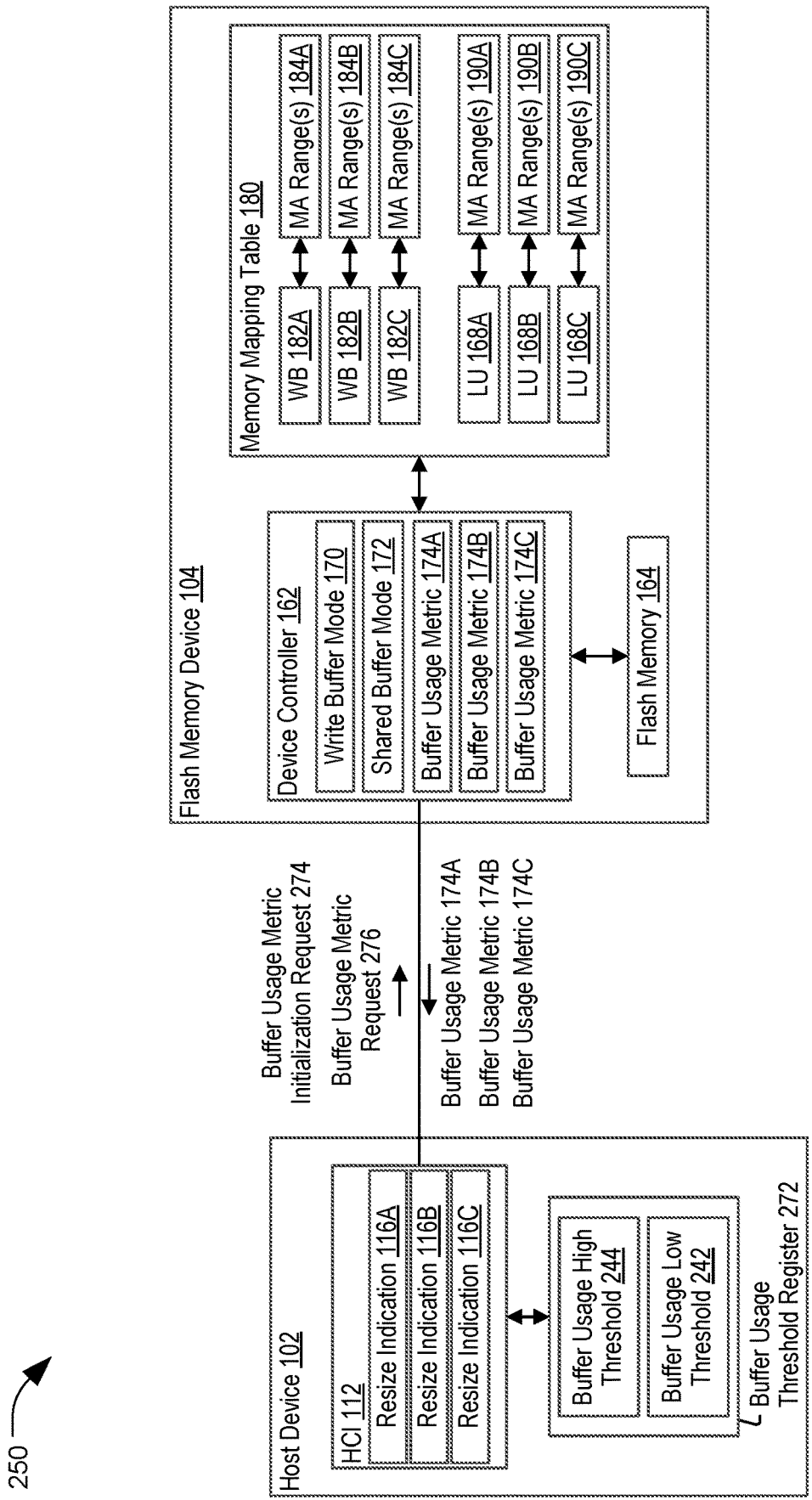
FIG. 2B is a diagram of another illustrative aspect of obtaining a resize indication that can be performed by the system of FIG. 1, in accordance with some examples of the present disclosure.

Referring to FIG. 2B, a diagram 250 is shown of a particular illustrative aspect of obtaining a resize indication that can be performed by the system 100 of FIG. 1. The HCI 112 can periodically or at various times send a buffer usage metric request 276 to the device controller 162. The device controller 162, in response to receiving the buffer usage metric request 276 (e.g., a write buffer full count ALL READ instruction), sends the buffer usage metrics 174 to the host device 102.

The HCI 112 compares the buffer usage metrics 174 to the buffer usage low threshold 242, the buffer usage high threshold 244, or both, to generate resize indications 116. For example, the HCI 112 generates the resize indication 116A of the write buffer 182A based on a comparison of the buffer usage metric 174A to the buffer usage low threshold 242, the buffer usage high threshold 244, or both, as described with reference to FIG. 2A. As another example, the HCI 112 generates the resize indication 116B of the write buffer 182B based on a comparison of the buffer usage metric 174B to the buffer usage low threshold 242, the buffer usage high threshold 244, or both. Similarly, in some implementations, the HCI 112 generates one or more additional resize indications, such as a resize indication 116C of the write buffer 182C based on a comparison of the buffer usage metric 174C and the buffer usage low threshold 242, the buffer usage high threshold 244, or both.

The HCI 112 can thus obtain buffer usage metrics 174 of multiple write buffers 182 and perform comparisons of the buffer usage metrics 174 to the buffer usage low threshold 242, the buffer usage high threshold 244, or both, to generate resize indications 116. A technical advantage of performing the comparisons at the HCI 112, as described with reference to FIGS. 2A-2B, can include support for flash memory devices (e.g., legacy devices) that are not configured to perform comparisons to the buffer usage low threshold 242, buffer usage high threshold 244, or both.

According to some implementations, the HCI 112 performs write buffer reallocation 114 of one or more of the write buffers 182 having an increase size indication 216. For example, the HCI 112, in response to determining that the write buffer 182A has an increase size indication 216, selects a particular memory resource 181 based on the memory resource usage metrics 118 and sends a request 166 to the device controller 162 to reallocate one or more portions of the particular memory resource 181 to the write buffer 182A, as described with reference to FIG. 1. Similarly, the HCI 112, in response to determining that the write buffer 182B has an increase size indication 216, selects a particular memory resource 181 (that has not been resized subsequent to generating the resize indications 116) based on the memory resource usage metrics 118 and sends a request 166 to the device controller 162 to reallocate one or more portions of the particular memory resource 181 to the write buffer 182B.

According to some implementations, the HCI 112 performs write buffer deallocation 120 for any of the one or more write buffers 182 having a decrease size indication 214 that have not already been decreased in performing the write buffer reallocations 114. For example, the HCI 112, in response to determining that the write buffer 182C has a decrease size indication 214 and that a size of the write buffer 182C has not been decreased to increase a size of the write buffer 182A or the write buffer 182B, sends a request 166 to the device controller 162 to deallocate one or more portions of the write buffer 182C, as further described with reference to FIG. 10. The device controller 162 updates a usage metric of any memory resource that is resized.

Figure 2C:
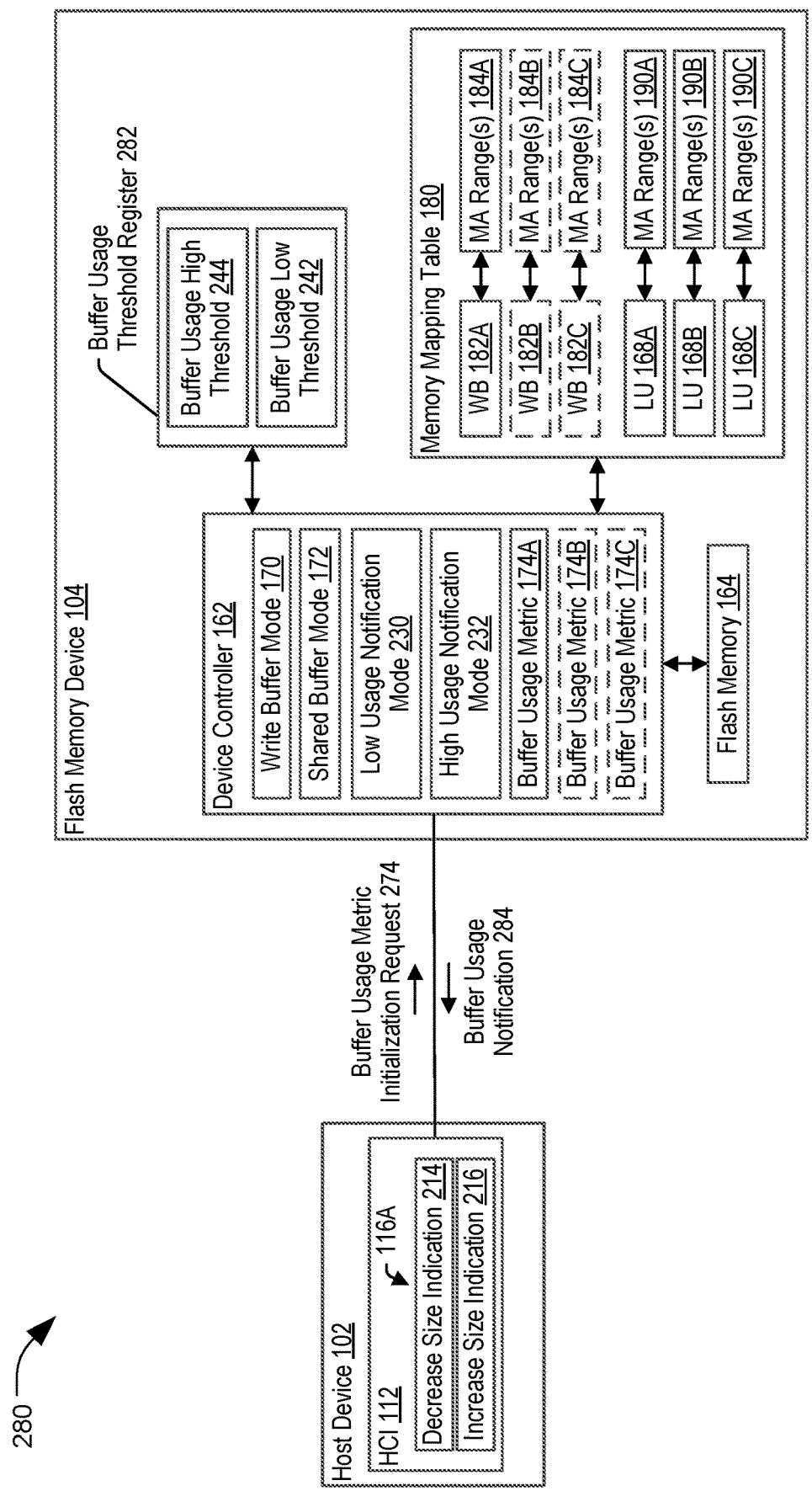
FIG. 2C is a diagram of another illustrative aspect of obtaining a resize indication that can be performed by the system of FIG. 1, in accordance with some examples of the present disclosure.

Referring to FIG. 2C, a diagram 280 is shown of a particular illustrative aspect of obtaining a resize indication that can be performed by the system 100 of FIG. 1. The flash memory device 104 includes a buffer usage threshold register 282 coupled to the device controller 162.

The buffer usage threshold register 282 is configured to store the buffer usage low threshold 242, the buffer usage high threshold 244, or both. In an example, the buffer usage threshold register 282 has a particular size (e.g., 16 bits). A first half (e.g., bits 0 to 7) of the buffer usage threshold register 282 is used to store the buffer usage low threshold 242 and a second half (e.g., bits 8 to 15) of the buffer usage threshold register 282 is used to store the buffer usage high threshold 244.

It should be understood that the buffer usage threshold register 282 storing the buffer usage low threshold 242, the buffer usage high threshold 244, or both, is provided as an illustrative example. In other examples, the buffer usage threshold register 282 can be included in the device controller 162 or another type of data storage coupled to (or included in) the device controller 162 can be used to store the buffer usage low threshold 242, the buffer usage high threshold 244, or both.

According to some implementations, the HCI 112 sends a request 166 (e.g., the buffer usage metric initialization request 274 of FIG. 2A or another request) to the device controller 162 to activate buffer usage notifications. In an illustrative implementation, the request 166 includes an attribute (e.g., an exception event control attribute) with a first field (e.g., a write-buffer-full-count-too-low-enabled bit) to indicate whether a low buffer usage notification is enabled, a second field (e.g., a write-buffer-full-count-too-high-enabled bit) to indicate whether a high buffer usage notification is enabled, or both.

The device controller 162, in response to determining that the first field has a first value (e.g., 1), enables a low usage notification mode 230 indicating the device controller 162 is to send a buffer usage notification 284 (e.g., the notification 178 of FIG. 1) to the host device 102 when a buffer usage metric 174 is less than the buffer usage low threshold 242. The device controller 162, in response to determining that the second field has a first value (e.g., 1), enables a high usage notification mode 232 indicating the device controller 162 is to send a buffer usage notification 284 (e.g., the notification 178 of FIG. 1) to the host device 102 when a buffer usage metric 174 is greater than the buffer usage high threshold 244.

The device controller 162 can periodically or at various times (e.g., responsive to a buffer usage metric update) compare the one or more buffer usage metrics 174 to the buffer usage low threshold 242, the buffer usage high threshold 244, or both. For example, the device controller 162, responsive to an update of the buffer usage metric 174A and determining that the low usage notification mode 230 is enabled, compares the buffer usage metric 174A to the buffer usage low threshold 242.

According to some implementations, an exception is triggered based on a comparison, at the device controller 162, of the buffer usage metric 174A to the buffer usage low threshold 242. For example, the exception is triggered when the buffer usage metric 174A is less than the buffer usage low threshold 242. The device controller 162, in response to detecting the exception, determines that the buffer usage metric 174A is less than the buffer usage low threshold 242.

The device controller 162, in response to determining that the low usage notification mode 230 is enabled and that the buffer usage metric 174A is less than the buffer usage low threshold 242, generates a buffer usage notification 284 and sends the buffer usage notification 284 to the host device 102. The buffer usage notification 284 indicates that the buffer usage metric 174A of the write buffer 182A is lower than the buffer usage low threshold 242.

In an illustrative implementation, the buffer usage notification 284 includes an attribute (e.g., an exception event status attribute) with a first field (e.g., a write-buffer-full-count-too-low bit) to indicate whether a buffer usage metric is less than the buffer usage low threshold 242. For example, the device controller 162 generates the buffer usage notification 284 with the first field (e.g., the write-buffer-full-count-too-low bit) set to a first value (e.g., 1) to indicate that the buffer usage metric 174A of the write buffer 182A is lower than the buffer usage low threshold 242. In an example, the buffer usage notification 284 also includes an identifier of the write buffer 182A.

The HCI 112, in response to receiving the buffer usage notification 284 indicating that the buffer usage metric 174A of the write buffer 182A is lower than the buffer usage low threshold 242, generates a decrease size indication 214 as the resize indication 116A of the write buffer 182A.

In another example, the device controller 162, responsive to an update of the buffer usage metric 174A and determining that the high usage notification mode 232 is enabled, compares the buffer usage metric 174A to the buffer usage high threshold 244. According to some implementations, an exception is triggered based on a comparison, at the device controller 162, of the buffer usage metric 174A to the buffer usage high threshold 244. For example, the exception is triggered when the buffer usage metric 174A is greater than the buffer usage high threshold 244. The device controller 162, in response to detecting the exception, determines that the buffer usage metric 174A is greater than the buffer usage high threshold 244.

The device controller 162, in response to determining that the buffer usage metric 174A is greater than the buffer usage high threshold 244, generates a buffer usage notification 284 indicating that the buffer usage metric 174A of the write buffer 182A is greater than the buffer usage high threshold 244.

The device controller 162, in response to determining that the high usage notification mode 232 is enabled and that the buffer usage metric 174A is greater than the buffer usage high threshold 244, generates a buffer usage notification 284 and sends the buffer usage notification 284 to the host device 102. The buffer usage notification 284 indicates that the buffer usage metric 174A of the write buffer 182A is greater than the buffer usage low threshold 242.

In an illustrative implementation, the buffer usage notification 284 includes an attribute (e.g., an exception event status attribute) with a second field (e.g., a write-buffer-full-count-too-high bit) to indicate whether a buffer usage metric is greater than the buffer usage high threshold 244. For example, the device controller 162 generates the buffer usage notification 284 with the second field (e.g., the write-buffer-full-count-too-high bit) set to a first value (e.g., 1) to indicate that the buffer usage metric 174A of the write buffer 182A is higher than the buffer usage high threshold 244. In an example, the buffer usage notification 284 also includes an identifier of the write buffer 182A.

The HCI 112, in response to receiving the buffer usage notification 284 indicating that the buffer usage metric 174A of the write buffer 182A is greater than the buffer usage high threshold 244, generates an increase size indication 216 as the resize indication 116A of the write buffer 182A.

The HCI 112 can thus receive buffer usage notifications 284 based on comparison of the one or more buffer usage metrics 174 to the buffer usage low threshold 242, the buffer usage high threshold 244, or both, that are performed at the flash memory device 104. The HCI 112 can generate one or more resize indication 116 based on the one or more buffer usage notifications 284. A technical advantage of having the device controller 162 perform the comparisons locally can include using fewer communication resources to send a notification to the host device 102 when a buffer usage metric 174 is outside a buffer usage threshold as compared to sending the one or more buffer usage metrics 174 to the host device 102 for each comparison with the buffer usage thresholds.

Figure 3:
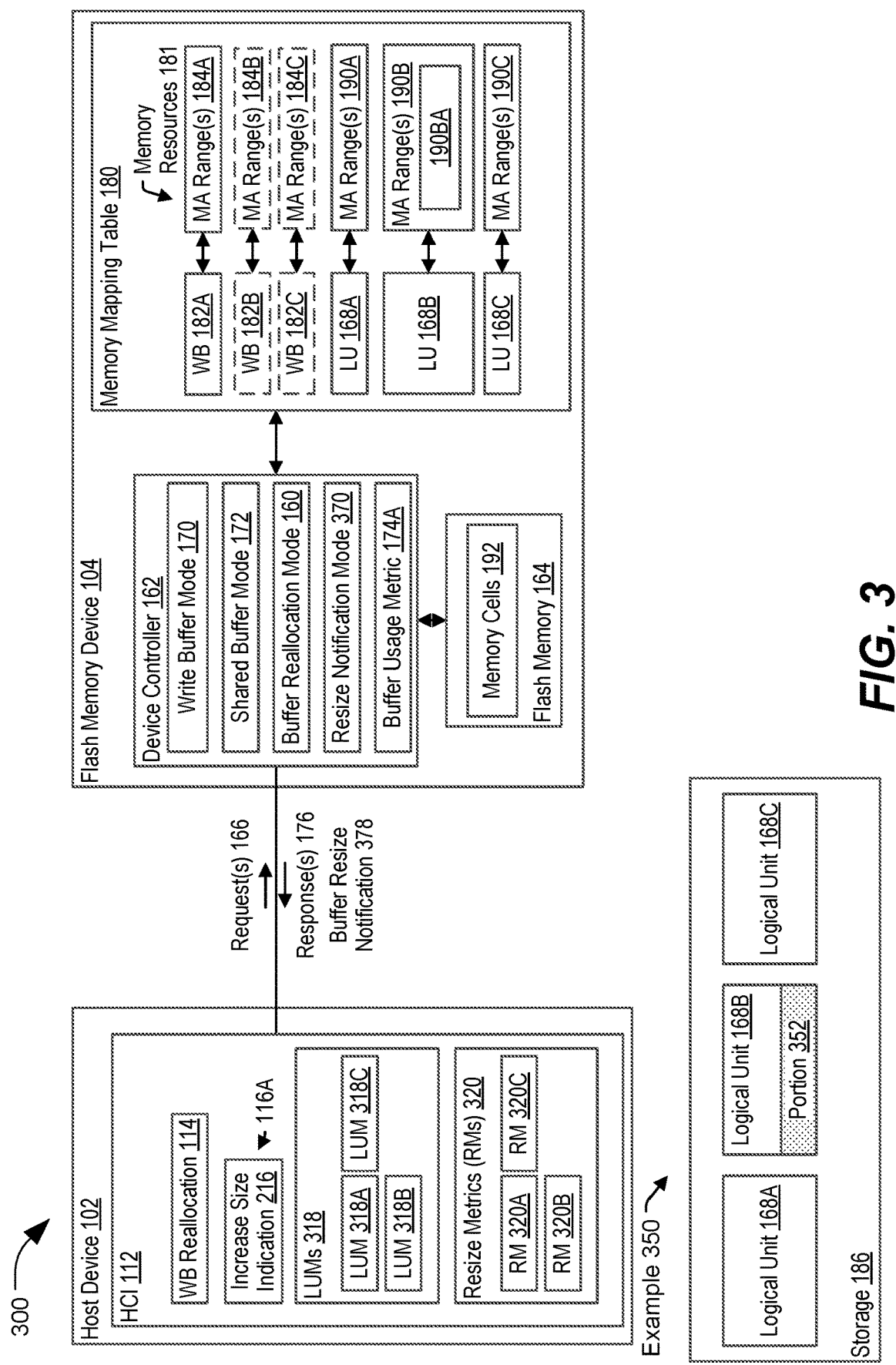
FIG. 3 is a diagram of an illustrative aspect of write buffer allocation that can be performed by the system of FIG. 1, in accordance with some examples of the present disclosure.
Figure 4:
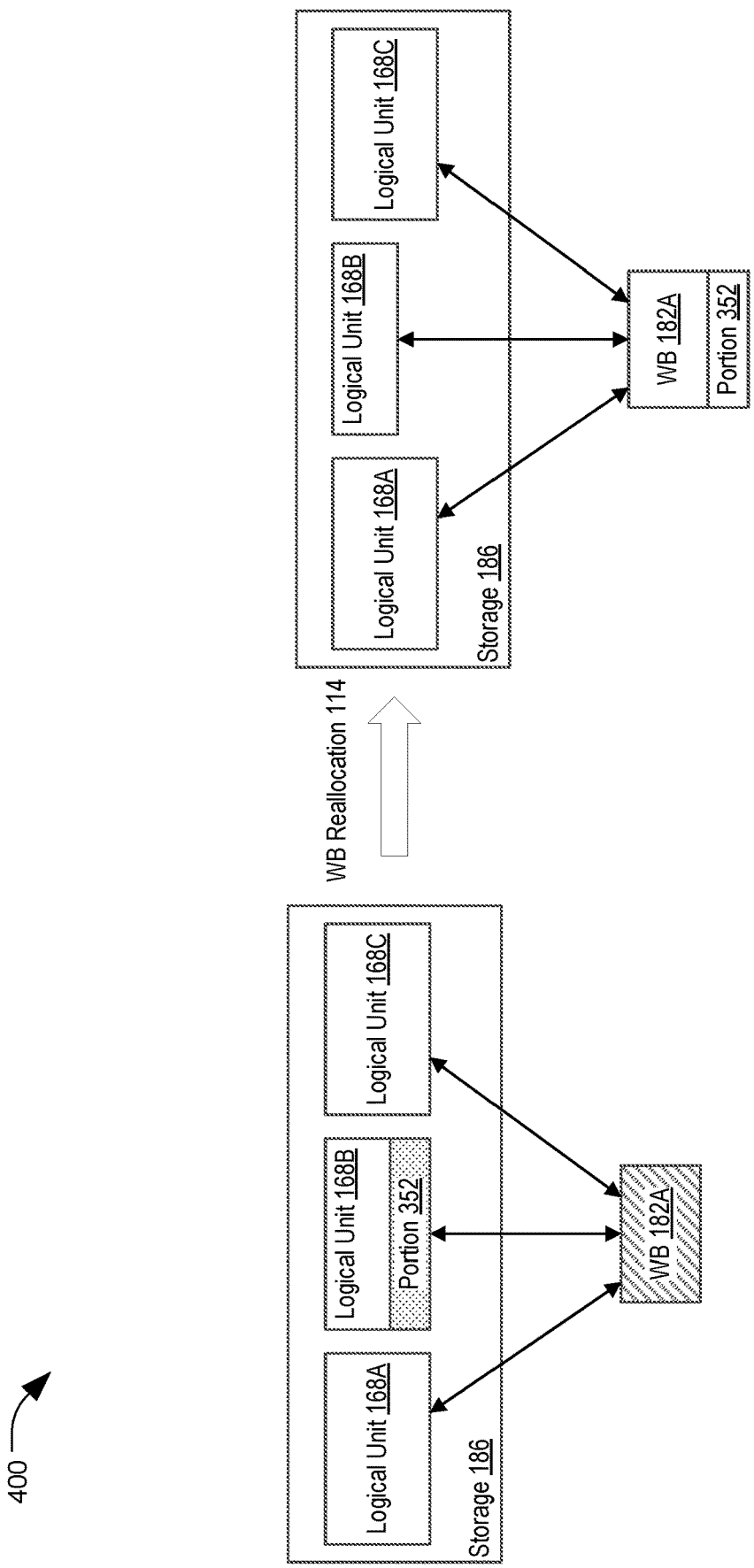
FIG. 4 is a diagram of an illustrative aspect of performing the write buffer allocation of FIG. 3 for a shared write buffer, in accordance with some examples of the present disclosure.
Figure 5:
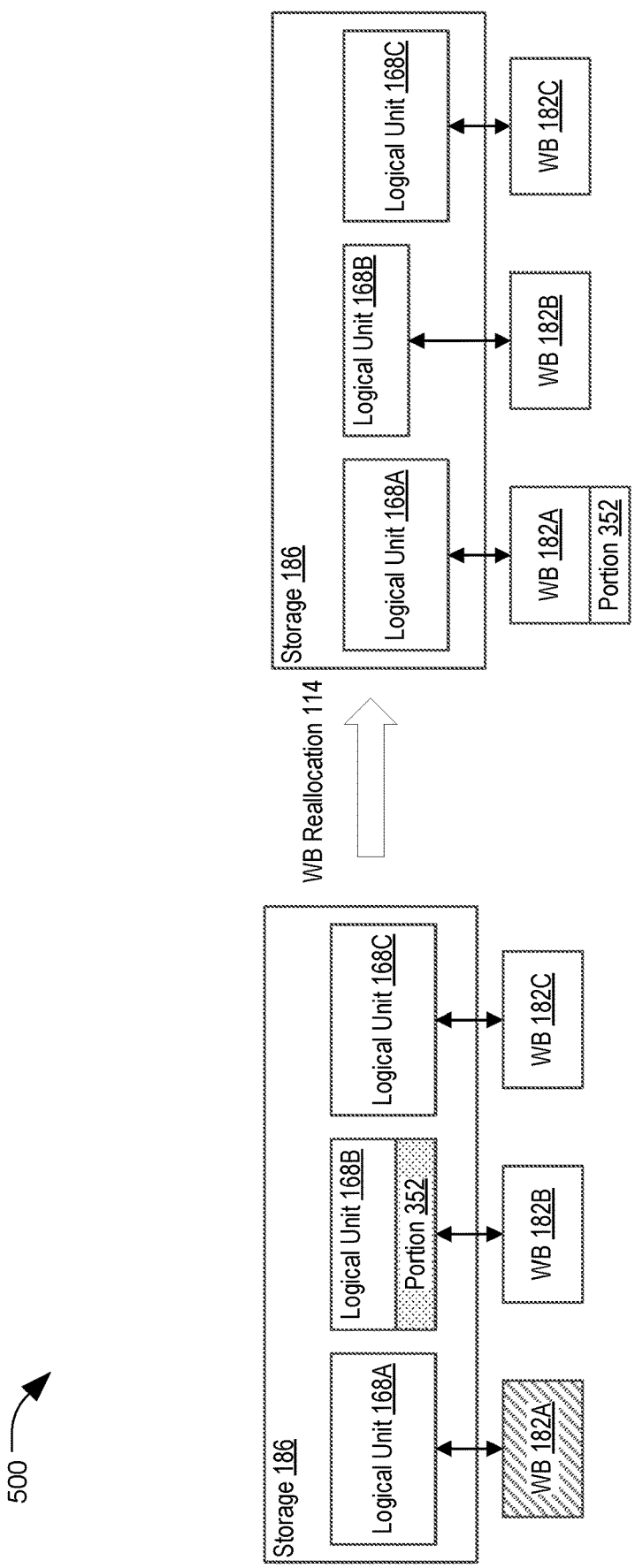
FIG. 5 is a diagram of an illustrative aspect of performing the write buffer allocation of FIG. 3 for a dedicated write buffer, in accordance with some examples of the present disclosure.
Figure 6:
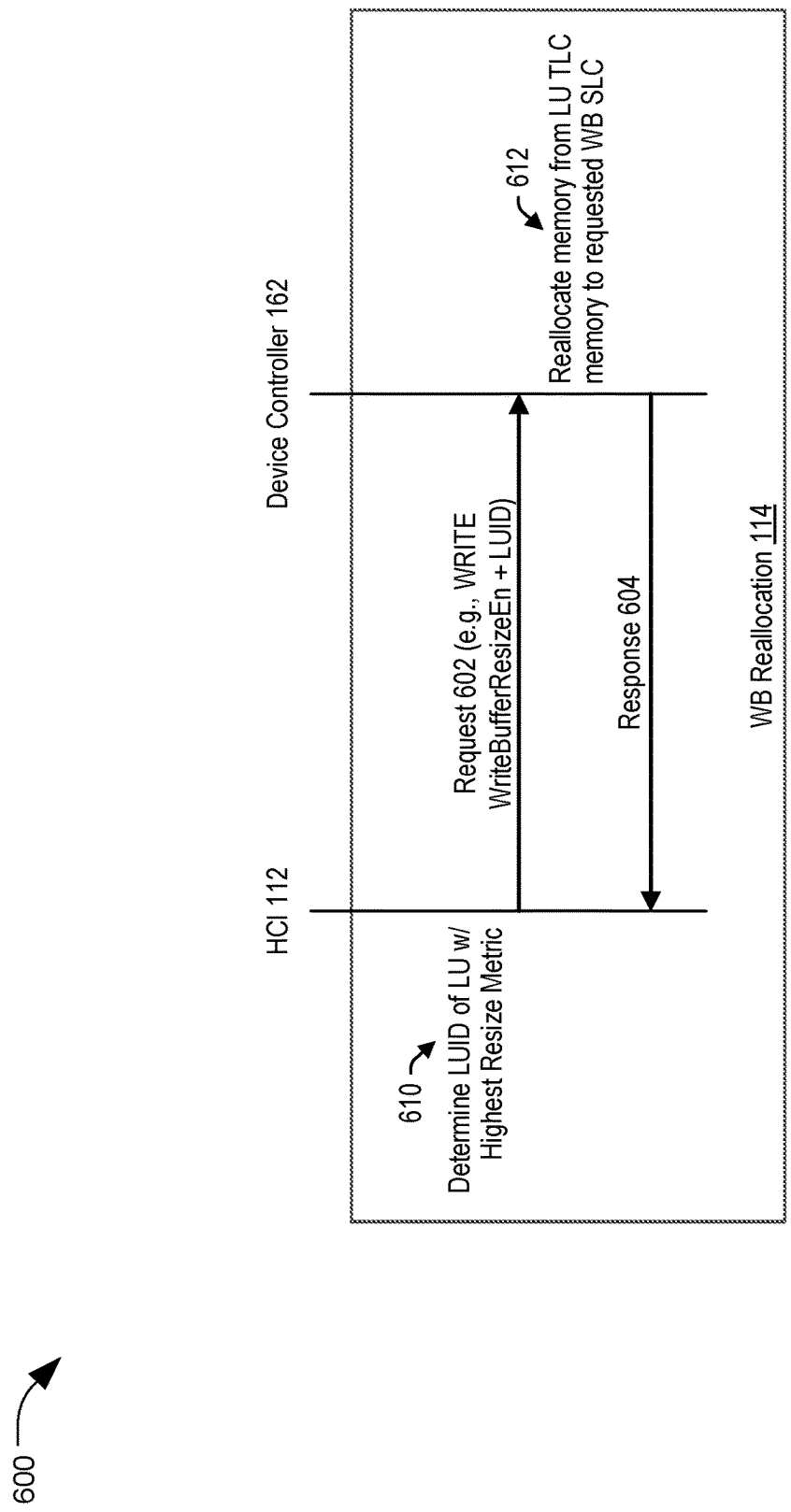
FIG. 6 is a ladder diagram of an illustrative aspect of operations associated with the write buffer allocation of FIG. 3, in accordance with some examples of the present disclosure.

FIGS. 3-6 illustrate examples in which a logical unit is used for write buffer reallocation 114. FIG. 3 illustrates an example of components of the system 100 that can use a logical unit for write buffer reallocation 114. FIG. 4 illustrates an example of using a logical unit for write buffer reallocation 114 of a shared write buffer. FIG. 5 illustrates an example of using a logical unit for write buffer reallocation 114 of a dedicated write buffer. FIG. 6 includes a ladder diagram of an illustrative example of using a logical unit for write buffer reallocation 114.

Referring to FIG. 3, a diagram 300 is shown of an illustrative aspect of write buffer allocation 114 that can be performed by the system 100 of FIG. 1. The HCI 112 obtains an increase size indication 216 as the resize indication 116A of the write buffer 182A, as described with reference to FIGS. 2A-2C.

The HCI 112 determines whether a logical unit or a write buffer is to be used for write buffer reallocation 114. According to some implementations, the HCI 112 has access to (e.g., a copy of) indicators of the write buffer mode 170, the shared buffer mode 172, and the buffer reallocation mode 160 of the flash memory device 104. The HCI 112, in response to determining that the shared buffer mode 172 is enabled or that the shared buffer mode 172 is disabled and the buffer reallocation mode 160 is disabled, determines that a logical unit is to be used for the write buffer reallocation 114. Alternatively, the HCI 112, in response to determining that the shared buffer mode 172 is disabled and the buffer reallocation mode 160 is enabled, determines that a write buffer is to be used for write buffer reallocation 114.

The HCI 112, in response to determining that a logical unit is to be used for the write buffer reallocation 114, obtains logical unit usage metrics 318 of the logical units 168. In a particular aspect, the logical unit usage metrics 318 include a logical unit usage metric 318A of the logical unit 168A, a logical unit usage metric 318B of the logical unit 168B, a logical unit usage metric 318C of the logical unit 168C, one or more additional logical unit usage metrics of one or more additional logical units, or a combination thereof.

In a particular aspect, the logical unit usage metrics 318 include availability metrics, utilization metrics, or both, of the logical units 168. For example, the logical unit usage metric 318A includes an availability metric, a utilization metric, or both, of the logical unit 168A. In a particular aspect, the availability metric of the logical unit 168A corresponds to an unused storage capacity of the logical unit 168A. In a particular aspect, the utilization metric of the logical unit 168A is based on a count of data accesses at the logical unit 168A.

According to some implementations, the HCI 112 maintains the logical unit usage metrics 318 during operation of the flash memory device 104. For example, the HCI 112, in response to accessing data stored in the logical unit 168A, updates (e.g., increments by 1) the utilization metric indicated by the logical unit usage metric 318A. In a particular aspect, the HCI 112 updates the utilization metric indicated by the logical unit usage metric 318A in response to sending a request 166 to the flash memory device 104 to access (e.g., read or write) data at a memory location in the logical unit 168A. In another aspect, the HCI 112 updates the utilization metric indicated by the logical unit usage metric 318A in response to receiving a response 176 from the flash memory device 104 that data is accessed (e.g., read from or written to) a memory location in the logical unit 168A.

In an example, the HCI 112, in response to writing data to a previously unused portion of the logical unit 168A, decreases the availability metric indicated by the logical unit usage metric 318A. Alternatively, the HCI 112, in response to deleting data from a portion of the logical unit 168A, increases the availability metric indicated by the logical unit usage metric 318A.

In a particular aspect, the HCI 112 updates the utilization metric indicated by the logical unit usage metric 318A responsive to allocating or deallocating one or more portions of memory to the logical unit 168A. In an example, the HCI 112 maintains portion utilization metrics. The HCI 112 increases the utilization metric indicated by the logical unit usage metric 318A based on portion utilization metrics of portions that are reallocated to the logical unit 168A. Alternatively, the HCI 112 decreases the utilization metric indicated by the logical unit usage metric 318A based on portion utilization metrics of portions that are deallocated from the logical unit 168A.

In a particular aspect, the HCI 112 updates the availability metric indicated by the logical unit usage metric 318A responsive to allocating or deallocating one or more portions of memory to the logical unit 168A. For example, the HCI 112 increases the availability metric indicated by the logical unit usage metric 318A based on a size of one or more portions reallocated to the logical unit 168A. As another example, the HCI 112 decreases the availability metric indicated by the logical unit usage metric 318A based on a size of one or more portions deallocated from the logical unit 168A.

According to some implementations, the device controller 162 maintains the logical unit usage metrics 318 and the HCI 112 obtains the logical unit usage metrics 318 from the device controller 162. In an example, the device controller 162, in response to accessing data stored in the logical unit 168A, updates (e.g., increments by 1) the utilization metric indicated by the logical unit usage metric 318A. In a particular aspect, the device controller 162 updates the utilization metric indicated by the logical unit usage metric 318A in response to accessing (e.g., reading or writing) data at a memory location in the logical unit 168A. In a particular aspect, the device controller 162 performs similar operations as described with reference to the HCI 112 to update the utilization metric, the availability metric, or both, indicated by the logical unit usage metric 318A responsive to allocating or deallocating one or more portions of memory to the logical unit 168A.

In some implementations in which the logical unit usage metrics 318 are maintained at the device controller 162, the HCI 112 sends a request 166 for the logical unit usage metrics 318 in response to determining that the resize indication 116A indicates that the size of the write buffer 182A is to be increased and that a logical unit is to be used for the write buffer reallocation 114. The device controller 162 sends a response 176 to the host device 102 indicating the logical unit usage metrics 318.

The HCI 112 generates resize metrics 320 based on the logical unit usage metrics 318. For example, the resize metrics 320 include a resize metric 320A of the write buffer 182A, a resize metric 320B of the write buffer 182B, a resize metric 320C of the write buffer 182C, one or more additional resize metrics of one or more additional write buffers, or a combination thereof.

The resize metric 320A is based on the availability metric, the utilization metric, or both, indicated by the logical unit usage metric 318A. In a particular implementation, the resize metric 320A corresponds to a weighted sum of the availability metric and the utilization metric. For example, R=W1*A−W2*U, where R corresponds to a resize metric, A corresponds to the availability metric, U corresponds to the utilization metric, W1 and W2 correspond to weights, and "*" indicates a multiplication operation. The HCI 112, in response to obtaining the increase size indication 216 for the write buffer 182A and determining that a logical unit is to be used for the write buffer reallocation 114, selects one of the logical units 168 based on the resize metrics 320. For example, the HCI 112 selects the logical unit 168B in response to determining that the resize metric 320B has a highest value among the resize metrics 320 indicating that the logical unit 168B has a lowest usage among the logical units 168.

In an example 350, the HCI 112 initiates conversion of a portion 352 of the logical unit 168B from the first memory type (e.g., TLC) to the second memory type (e.g., SLC) and reallocation of the portion 352 of the logical unit 168B to the write buffer 182A. For example, the HCI 112 sends a request 166 (e.g., a query request indicating WRITE write-booster-buffer-resize-enabled and an identifier (LUID) of the logical unit 168B) to the flash memory device 104 indicating that the logical unit 168B is to be used for write buffer reallocation 114 to the write buffer 182A. The device controller 162, in response to receiving the request 166, selects a portion 352 of the logical unit 168B that is available (e.g., is not in use to store data) and is of a predetermined size to be used for write buffer reallocation 114. In an example, the portion 352 corresponds to one or more memory address ranges 190BA.

The device controller 162 deallocates the portion 352 from the logical unit 168B. For example, the device controller 162 updates the memory mapping table 180 to remove the one or more memory address ranges 190BA from the one or more memory address ranges 190B allocated to the logical unit 168B. The device controller 162 converts memory cells corresponding to the one or more memory address ranges 190BA from having the first memory type (e.g., TLC) to the second memory type (e.g., SLC).

The device controller 162 reallocates the portion 352 to the write buffer 182A. For example, the device controller 162 updates the memory mapping table 180 to add the one or more memory address ranges 190BA (in addition to the one or more memory address ranges 184A) as allocated to the write buffer 182A. The device controller 162 sends a response 176 to the HCI 112 to indicate that the one or more memory address ranges 190BA have been reallocated from the logical unit 168B to the write buffer 182A.

In some implementations, the HCI 112 can activate buffer resize notifications at the flash memory device 104. For example, the HCI 112 sends a request 166 (e.g., the buffer usage metric initialization request 274 of FIG. 2A or another request) to the device controller 162 to enable buffer resize notifications. In an illustrative implementation, the request 166 includes an attribute (e.g., an exception event control attribute) with a particular field (e.g., a resize-request-completion-enabled bit) to indicate whether buffer resize notification is to be enabled.

The device controller 162, in response to determining that the particular field has a first value (e.g., 1), enables a resize notification mode 370 indicating that the device controller 162 is to send a buffer resize notification 378 (e.g., a notification 178 of FIG. 1) to the host device 102 when a buffer resize operation is completed at the device controller 162. For example, the device controller 162, in response to performing a write buffer reallocation 114 of the write buffer 182A when the resize notification mode 370 is enabled, sends a buffer resize notification 378 to the host device 102 indicating that the write buffer reallocation 114 of the write buffer 182A is successful. In some implementations, the buffer resize notification 378 indicates that the one or more memory address ranges 190BA have been reallocated from the logical unit 168B to the write buffer 182A.

In an illustrative implementation, a buffer resize notification 378 includes an attribute (e.g., an exception event status attribute) with a particular field (e.g., a resize-request-completion bit) to indicate whether a buffer resize is successful. For example, when the resize notification mode 370 is enabled, the device controller 162 sends the buffer resize notification 378 with the particular field (e.g., the resize-request-completion bit) set to a first value (e.g., 1) subsequent to performing the write buffer reallocation 114.

In FIG. 4, a diagram 400 is shown of an illustrative aspect of performing the write buffer reallocation 114 of FIG. 3 for a shared write buffer. For example, the write buffer 182A is a shared write buffer used as temporary storage for the logical units 168, and the portion 352 of the logical unit 168B is reallocated to the write buffer 182A.

In FIG. 5, a diagram 500 is shown of an illustrative aspect of performing the write buffer allocation 114 of FIG. 3 for a dedicated write buffer. For example, the write buffer 182A is a dedicated write buffer used as temporary storage for the logical unit 168A, and the portion 352 of the logical unit 168B is reallocated to the write buffer 182A. Any of the logical units 168 can be used for write buffer reallocation 114 to any of the write buffers 182 based on the logical unit usage metrics 318.

Referring to FIG. 6, a ladder diagram 600 is shown of an illustrative aspect of operations associated with the write buffer allocation 114 of FIG. 3. At 610, the HCI 112 determines an identifier of a logical unit 168 with a highest resize metric of the resize metrics 320. For example, the HCI 112, in response to obtaining the increase size indication 216 as the resize indication 116A of the write buffer 182A and determining that a logical unit is to be used for the write buffer reallocation 114, selects the logical unit 168B that has the resize metric 320B that is the highest among the resize metrics 320, as described with reference to FIG. 3. The HCI 112 determines an identifier of the logical unit 168B.

The HCI 112 sends a request 602 to the flash memory device 104 (e.g., the device controller 162). In an example, the request 602 (e.g., a write booster buffer resize enabled WRITE instruction) indicates the logical unit 168B (e.g., the identifier (LUID) of the logical unit 168B). In a particular aspect, the request 602 also indicates the write buffer 182A (e.g., an identifier of the write buffer 182A).

At 612, the device controller 162 reallocates memory from the logical unit 168B of the first memory type (e.g., TLC) to the write buffer 182A of the second memory type (e.g., SLC). For example, the device controller 162 deallocates the one or more memory address ranges 190BA of the portion 352 from the logical unit 168B, converts memory cells of the one or more memory address ranges 190BA from the first memory type (e.g., TLC) to the second memory type (e.g., SLC), reallocates the one or more memory address ranges 190BA to the write buffer 182A, as described with reference to FIG. 3.

The device controller 162 sends a response 604 to the host device 102 (e.g., the HCI 112) indicating that the write buffer reallocation 114 is successful. In a particular aspect, the response 604 indicates that the one or more memory address ranges 190BA are reallocated from the logical unit 168B to the write buffer 182A. In a particular aspect, the response 604 corresponds to the buffer resize notification 378 of FIG. 3.

A technical advantage of using a logical unit for write buffer reallocation 114 can include enabling write buffer reallocation when there is single shared write buffer. A technical advantage of using a logical unit for write buffer reallocation 114 when there are multiple dedicated write buffers can include fewer resizing operations having to be performed at the write buffers 182. For example, deallocating a portion of a particular write buffer to increase the size of another write buffer can cause the particular write buffer to get filled to capacity more often and subsequently have to be resized.

FIGS. 7-9 illustrate examples in which a write buffer is used for write buffer reallocation 114 of another write buffer. FIG. 7 illustrates an example of components of the system 100 that can use a write buffer for write buffer reallocation 114 of another write buffer. FIG. 8 illustrates an example of using a write buffer for write buffer reallocation 114 of a dedicated write buffer. FIG. 9 includes a ladder diagram of an illustrative example of using a write buffer for write buffer reallocation 114 of another write buffer.

Referring to FIG. 7, a diagram 700 is shown of an illustrative aspect of write buffer allocation that can be performed by the system 100 of FIG. 1. The HCI 112 obtains an increase size indication 216 as the resize indication 116A of the write buffer 182A, as described with reference to FIGS. 2A-2C.

The HCI 112 determines whether a logical unit or a write buffer is to be used for write buffer reallocation 114, as described with reference to FIG. 3. For example, the HCI 112, in response to determining that the shared buffer mode 172 is disabled and the buffer reallocation mode 160 is enabled, determines that a write buffer is to be used for write buffer reallocation 114.

The HCI 112, in response to determining that a write buffer is to be used for the write buffer reallocation 114, obtains the one or more buffer usage metrics 174 from the device controller 162. For example, the HCI 112, in response to determining that the resize indication 116A indicates that the size of the write buffer 182A is to be increased and that a write buffer is to be used for the write buffer reallocation 114, sends a request 166 for the one or more buffer usage metrics 174 to the flash memory device 104. The device controller 162 sends a response 176 to the host device 102 indicating the one or more buffer usage metrics 174.

The HCI 112, in response to obtaining the increase size indication 216 for the write buffer 182A and determining that a write buffer is to be used for the write buffer reallocation 114, selects one of the write buffers 182 based on the one or more buffer usage metrics 174. For example, the HCI 112 selects the write buffer 182B in response to determining that the buffer usage metric 174B indicates that the write buffer 182B has a lowest usage among the write buffers 182.

In a particular aspect, the HCI 112 selects the write buffer 182B further based on determining that the buffer usage metric 174B is less than or equal to the buffer usage high threshold 244. Alternatively, the HCI 112, in response to determining that the buffer usage metric 174B indicates the lowest usage of the write buffers 182 but that the buffer usage metric 174B is higher than the buffer usage high threshold 244, determines that a size of all write buffers is to be increased and that there is no write buffer available for reallocation. In some aspects, the HCI 112 provides an alert to the host device 102 in response to determining that a size of all write buffers is to be increased and there is no write buffer available for reallocation. In some implementations, the HCI 112, in response to determining that a size of all write buffers is to be increased and there is no write buffer available for reallocation, disables the buffer reallocation mode 160 so that write buffer reallocation 114 can be performed using a logical unit, as described with reference to FIG. 3. At a later time, the HCI 112 can enable the buffer reallocation mode 160 in response to determining that a buffer usage metric 174 of at least one write buffer 182 is less than the buffer usage low threshold 242.

In an example 750, the HCI 112, in response to selecting the write buffer 182B for the write buffer reallocation 114, initiates reallocation of a portion 752 of the write buffer 182B to the write buffer 182A. For example, the HCI 112 sends a request 166 (e.g., a query request indicating WRITE write-booster-buffer-resize-enabled and an identifier (WBID) of the write buffer 182B) to the flash memory device 104 indicating that the write buffer 182B is to be used for write buffer reallocation 114 to the write buffer 182A. The device controller 162, in response to receiving the request 166, selects the portion 752 of the write buffer 182B of a predetermined size to be used for write buffer reallocation 114. The portion 752 corresponds to one or more memory address ranges 184BA.

The device controller 162 deallocates the portion 752 from the write buffer 182B. For example, the device controller 162 updates the memory mapping table 180 to remove the one or more memory address ranges 184BA from the one or more memory address ranges 184B allocated to the write buffer 182B. In a particular aspect, the device controller 162 performs a flush of the write buffer 182B prior to deallocating the portion 752 from the write buffer 182B. For example, the device controller 162 performs the flush of the write buffer 182B in response to determining that the portion 752 is in use to store data.

The device controller 162 reallocates the portion 752 to the write buffer 182A. For example, the device controller 162 updates the memory mapping table 180 to add the one or more memory address ranges 184BA (in addition to the one or more memory address ranges 184A) as allocated to the write buffer 182A. The device controller 162 sends a response 176 to the HCI 112 to indicate that the one or more memory address ranges 184BA have been reallocated from the write buffer 182B to the write buffer 182A.

In some examples, the device controller 162, in response to performing a write buffer reallocation 114 of the write buffer 182A when the resize notification mode 370 is enabled, sends a buffer resize notification 378 to the host device 102 indicating that the write buffer reallocation 114 of the write buffer 182A is successful. In some implementations, the buffer resize notification 378 indicates that the one or more memory address ranges 184BA have been reallocated from the write buffer 182B to the write buffer 182A. For example, when the resize notification mode 370 is enabled, the device controller 162 sends the buffer resize notification 378 with a particular field (e.g., the resize-request-completion bit) set to a first value (e.g., 1) subsequent to performing the write buffer reallocation 114.

In FIG. 8, a diagram 800 is shown of an illustrative aspect of performing the write buffer allocation 114 of FIG. 7 for a dedicated write buffer. For example, the write buffer 182A is a dedicated write buffer used as temporary storage for the logical unit 168A, the write buffer 182B is a dedicated write buffer used as temporary storage for the logical unit 168B, and the portion 752 of the write buffer 182B is reallocated to the write buffer 182A.

Referring to FIG. 9, a ladder diagram 900 is shown of an illustrative aspect of operations associated with the write buffer allocation 114 of FIG. 7. The HCI 112 sends a request 902 (e.g., a write buffer full count ALL READ instruction) to the flash memory device 104 (e.g., the device controller 162) for the buffer usage metrics 174.

At 910, the device controller 162, in response to receiving the request 902, sends a response 904 to the host device 102 (e.g., the HCI 112) indicating the buffer usage metrics 174. For example, the response 904 includes identifiers of the write buffers 182 and respective buffer usage metrics 174.

At 912, the HCI 112 determines an identifier of a write buffer with a lowest buffer usage metric of the buffer usage metrics 174. For example, the HCI 112, in response to obtaining the increase size indication 216 as the resize indication 116A of the write buffer 182A and determining that a write buffer is to be used for the write buffer reallocation 114, selects the write buffer 182B that has the buffer usage metric 174B that is the lowest among the buffer usage metrics 174, as described with reference to FIG. 7. The HCI 112 determines an identifier of the write buffer 182B.

The HCI 112 sends a request 906 to the flash memory device 104 (e.g., the device controller 162). In an example, the request 906 (e.g., a write booster buffer resize enabled WRITE instruction) indicates the write buffer 182B (e.g., the identifier (WBID) of the write buffer 182B). In a particular aspect, the request 906 also indicates the write buffer 182A (e.g., an identifier of the write buffer 182A).

At 914, the device controller 162 reallocates memory from the write buffer 182B of the second memory type (e.g., SLC) to the write buffer 182A of the second memory type (e.g., SLC). For example, the device controller 162 deallocates the one or more memory address ranges 184BA of the portion 752 from the write buffer 182B, and allocates the one or more memory address ranges 184BA to the write buffer 182A, as described with reference to FIG. 7. The device controller 162 sends a response 908 to the host device 102 (e.g., the HCI 112) indicating that the write buffer reallocation 114 is successful. In a particular aspect, the response 908 indicates that the one or more memory address ranges 184BA are reallocated from the write buffer 182B to the write buffer 182A. In a particular aspect, the response 908 corresponds to the buffer resize notification 378, as described with reference to FIG. 7.

A technical advantage of using a write buffer for write buffer reallocation 114 can include setting a predetermined memory space for write buffers that can be dynamically allocated between the write buffers based on buffer usage. In some aspects, when no write buffers are available for write buffer reallocation 114, the buffer reallocation mode 160 can be disabled to use logical units for write buffer reallocation 114.

Figure 10:
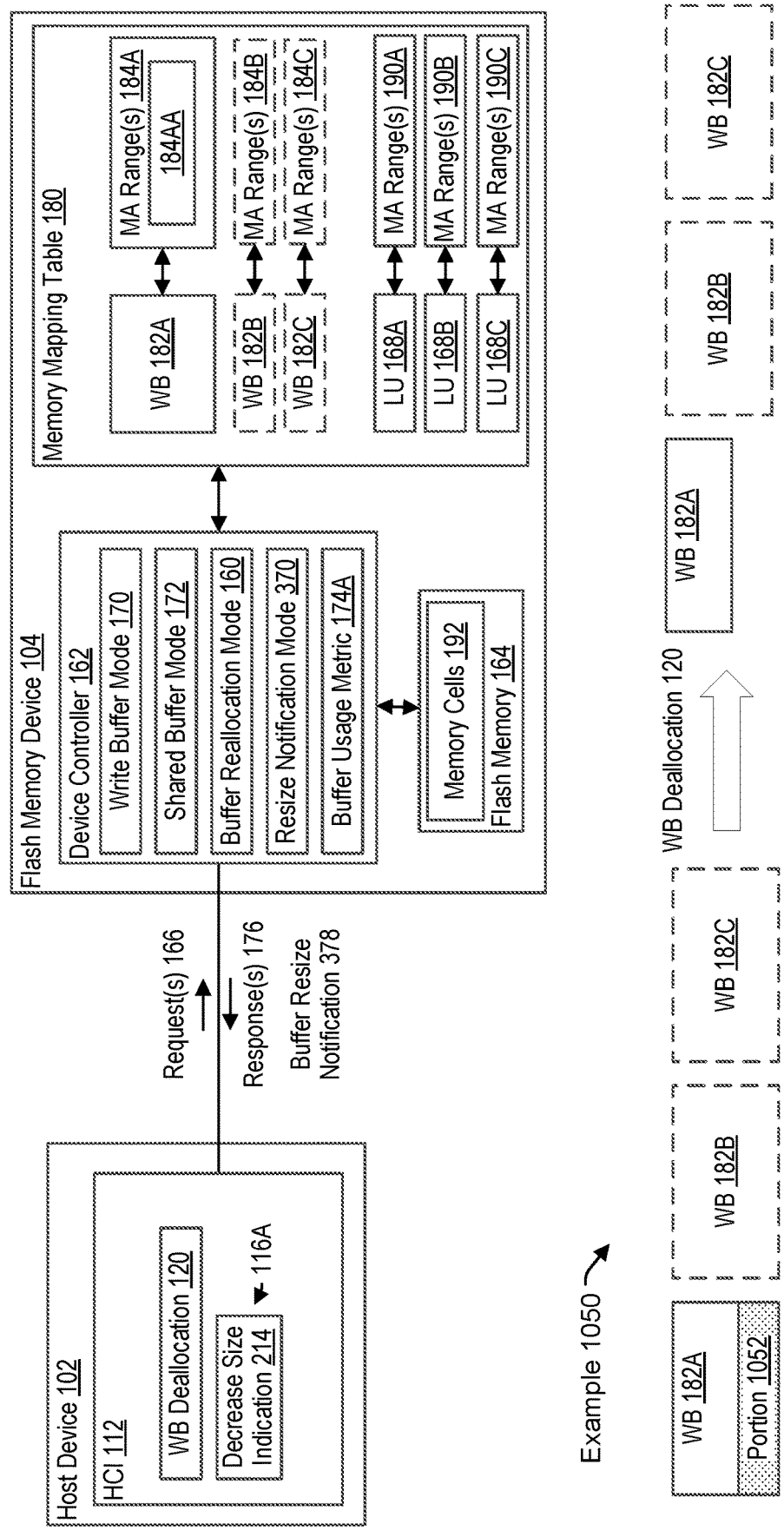
FIG. 10 is a diagram of an illustrative aspect of write buffer deallocation that can be performed by the system of FIG. 1, in accordance with some examples of the present disclosure.

Referring to FIG. 10, a diagram 1000 is shown of an illustrative aspect of write buffer deallocation that can be performed by the system 100 of FIG. 1. The HCI 112 obtains a decrease size indication 214 as the resize indication 116A of the write buffer 182A, as described with reference to FIGS. 2A-2C.

In an example 1050, the HCI 112, in response to obtaining the decrease size indication 214, initiates deallocation of a portion 1052 of the write buffer 182A. For example, the HCI 112 sends a request 166 (e.g., a query request indicating write write-booster-buffer-resize-enabled and an identifier (WBID) of the write buffer 182A) to the flash memory device 104 indicating that write buffer deallocation 120 of the write buffer 182A is to be performed. The device controller 162, in response to receiving the request 166, selects the portion 1052 of the write buffer 182B of a predetermined size for write buffer deallocation 120. The portion 1052 corresponds to one or more memory address ranges 184AA.

The device controller 162 deallocates the portion 1052 from the write buffer 182A. For example, the device controller 162 updates the memory mapping table 180 to remove the one or more memory address ranges 184AA from the one or more memory address ranges 184A allocated to the write buffer 182A. In a particular aspect, the device controller 162 performs a flush of the write buffer 182A prior to deallocating the portion 1052. For example, the device controller 162 performs the flush of the write buffer 182A in response to determining that the portion 1052 is in use to store data.

The device controller 162 sends a response 176 to the host device 102 indicating that the write buffer deallocation 120 is successful. In some implementations, the response 176 indicates that the one or more memory address ranges 184AA are deallocated from the write buffer 182A.

In some implementations, the device controller 162, in response to performing a write buffer deallocation 120 of the write buffer 182A when the resize notification mode 370 is enabled, sends a buffer resize notification 378 to the host device 102 indicating that the write buffer deallocation 120 of the write buffer 182A is successful. To illustrate, the buffer resize notification 378 indicates that the one or more memory address ranges 184AA have been deallocated from the write buffer 182A. For example, the device controller 162 sends the buffer resize notification 378 with the particular field (e.g., the resize-request-completion bit) set to a first value (e.g., 1) subsequent to performing the write buffer deallocation 120.

According to some implementations, the device controller 162, in response to determining that the shared buffer mode 172 is disabled, reallocates the portion 1052 to another write buffer based on the buffer usage metrics 174. For example, the device controller 162 selects the buffer usage metric 174B having the buffer usage metric 174B that indicates highest usage among the buffer usage metrics 174 and reallocates the portion 1052 to the write buffer 182B. To illustrate, the device controller 162 updates the memory mapping table 180 to add the one or more memory address ranges 184AA (in addition to the one or more memory address ranges 184B) as allocated to the write buffer 182B. In these implementations, the response 176 (e.g., the buffer resize notification 378) indicates that the one or more memory address ranges 184AA are reallocated to the write buffer 182B.

According to some implementations, the device controller 162, in response to determining that the shared buffer mode 172 is enabled or that the shared buffer mode 172 is disabled and the buffer usage metric 174B (e.g., the highest buffer usage metric) is lower than a particular threshold, allocates the portion 1052 to a logical unit. For example, the device controller 162 selects the logical unit 168B in response to determining that a resize metric 320B is lowest (e.g., indicating highest usage) among the resize metrics 320 and allocates the portion 1052 to the logical unit 168B. To illustrate, the device controller 162 converts memory cells of the one or more memory address ranges 184AA from a second memory type (e.g., SLC) to a first memory type (e.g., TLC) and updates the memory mapping table 180 to add the one or more memory address ranges 184AA (in addition to the one or more memory address ranges 190B) as allocated to the logical unit 168B. In these implementations, the response 176 (e.g., the buffer resize notification 378) indicates that the one or more memory address ranges 184AA are reallocated to the logical unit 168B.

Figure 11:
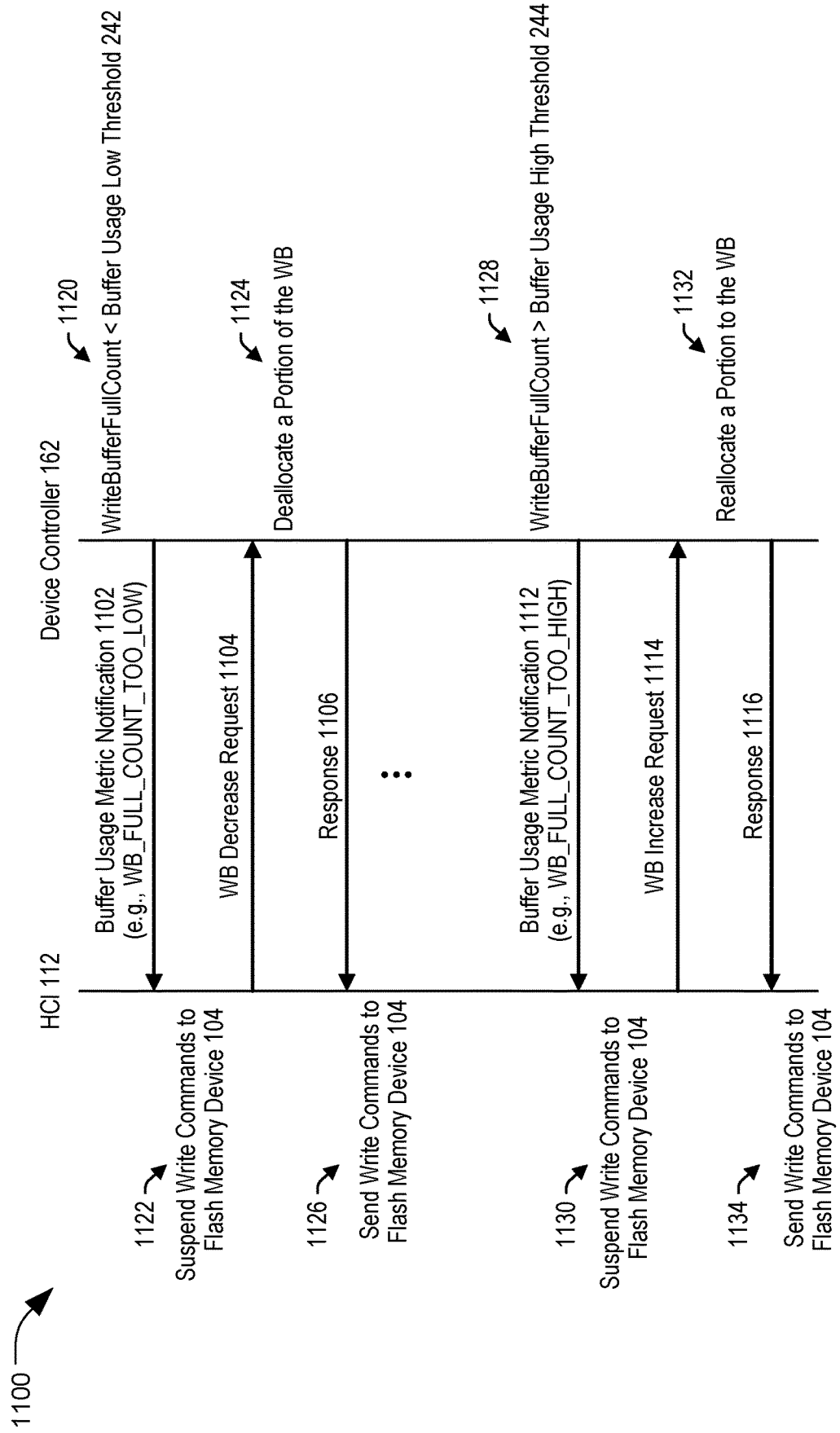
FIG. 11 is a ladder diagram of an illustrative aspect of operations associated with write buffer resizing that can be performed by the system of FIG. 1, in accordance with some examples of the present disclosure.

Referring to FIG. 11, a ladder diagram 1100 is shown of an illustrative aspect of operations associated with write buffer resizing that can be performed by the system of FIG. 1. In a particular aspect, one or more of the operations illustrated in the ladder diagram 1100 are performed by the HCI 112, the host device 102, the device controller 162, the flash memory 164, the flash memory device 104, the system 100 of FIG. 1, or a combination thereof.

At 1120, the device controller 162 determines that the buffer usage metric 174A is less than the buffer usage low threshold 242. For example, the device controller 162 detects that an exception is triggered indicating that the buffer usage metric 174A is less than the buffer usage low threshold 242. The device controller 162 sends a buffer usage metric notification 1102 (e.g., a write buffer full count too low notification) to the host device 102 (e.g., the HCI 112). The buffer usage metric notification 1102 indicates that the buffer usage metric 174A of the write buffer 182A is less than the buffer usage low threshold 242.

At 1122, the HCI 112, in response to receiving the buffer usage metric notification 1102, determines that a decrease size indication 214 as the resize indication 116A of the write buffer 182A is received. The HCI 112, in response to obtaining the decrease size indication 214 of the write buffer 182A, suspends write commands to the flash memory device 104 to perform the write buffer deallocation 120. In a particular aspect, the HCI 112 suspends the write commands to the flash memory device 104 in response to determining that a command queue at the host device 102 is low (e.g., empty) or that the command queue includes few (e.g., no) write commands for the flash memory device 104.

The HCI 112 sends a write buffer decrease request 1104 to the flash memory device 104 (e.g., the device controller 162). In a particular aspect, the write buffer decrease request 1104 indicates the write buffer 182A (e.g., an identifier of the write buffer 182A).

At 1124, the device controller 162, in response to receiving the write buffer decrease request 1104, deallocates a portion 1052 of the write buffer 182A, as described with reference to FIG. 10. The device controller 162 sends a response 1106 to the host device 102 (e.g., the HCI 112) indicating that the write buffer deallocation 120 is successful. At 1126, the HCI 112, in response to receiving the response 1106, resumes sending write commands to the flash memory device 104. In a particular aspect, the response 1106 corresponds to the buffer resize notification 378, as described with reference to FIG. 10.

Subsequently, at 1128, the device controller 162 determines that the buffer usage metric 174A is greater than the buffer usage high threshold 244. For example, the device controller 162 detects that an exception is triggered indicating that the buffer usage metric 174A is greater than the buffer usage high threshold 244. The device controller 162 sends a buffer usage metric notification 1112 (e.g., a write buffer full count too high notification) to the host device 102 (e.g., the HCI 112). The buffer usage metric notification 1112 indicates that the buffer usage metric 174A of the write buffer 182A is greater than the buffer usage high threshold 244.

At 1130, the HCI 112, in response to receiving the buffer usage metric notification 1102, determines that an increase size indication 216 as the resize indication 116A of the write buffer 182A is received. The HCI 112, in response to obtaining the increase size indication 216 of the write buffer 182A, suspends write commands to the flash memory device 104 to perform the write buffer reallocation 114. In a particular aspect, the HCI 112 suspends the write commands to the flash memory device 104 in response to determining that a command queue at the host device 102 is low (e.g., empty) or that the command queue includes few (e.g., no) write commands for the flash memory device 104.

The HCI 112 sends a write buffer increase request 1114 to the flash memory device 104 (e.g., the device controller 162). In a particular aspect, the write buffer increase request 1114 indicates the write buffer 182A (e.g., an identifier of the write buffer 182A).

At 1132, the device controller 162, in response to receiving the write buffer increase request 1114, allocates a portion 352 of a logical unit 168B to the write buffer 182A, as described with reference to FIG. 3 or allocates a portion 752 of a write buffer 182B to the write buffer 182A, as described with reference to FIG. 7. In a particular implementation, the HCI 112 selects the logical unit 168B or the write buffer 182B for the write buffer reallocation 114, as described with reference to FIGS. 3-9, and the write buffer increase request 1114 indicates the selected one of the logical unit 168B or the write buffer 182B. In another implementation, the device controller 162, in response to receiving the write buffer increase request 1114, performs one or more operations described in with reference to the HCI 112 of FIGS. 3-9 to select one of the logical unit 168B or the write buffer 182B for the write buffer reallocation 114. The device controller 162 performs the write buffer reallocation 114 to reallocate a portion of the logical unit 168B or the write buffer 182B to the write buffer 182A, as described with reference to FIGS. 3-9.

The device controller 162 sends a response 1116 to the host device 102 (e.g., the HCI 112) indicating that the write buffer reallocation 114 is successful. In a particular aspect, the response 1116 indicates that the portion 352 is reallocated from the logical unit 168B to the write buffer 182A or that the portion 752 is reallocated from the write buffer 182B to the write buffer 182A. In a particular aspect, the response 1116 corresponds to the buffer resize notification 378, as described with reference to FIGS. 3 and 7. At 1134, the HCI 112, in response to receiving the response 1116, resumes sending write commands to the flash memory device 104.

Figure 12:
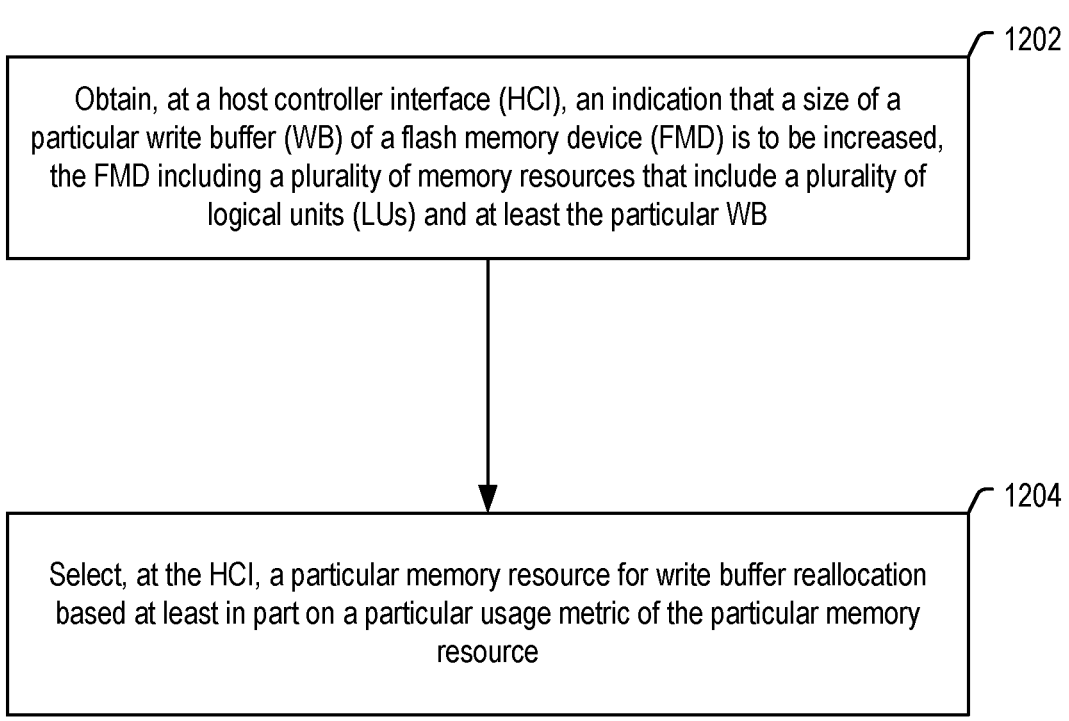
FIG. 12 is a diagram of a particular implementation of a method of host management of write buffer allocation for flash memory that may be performed by the system of FIG. 1, in accordance with some examples of the present disclosure.

FIG. 12 is a diagram of a particular implementation of a method 1200 of host management of write buffer allocation for flash memory that may be performed by the system of FIG. 1, in accordance with some examples of the present disclosure. In a particular aspect, one or more of the operations of the method 1200 are performed by the HCI 112, the host device 102, the device controller 162, the flash memory 164, the flash memory device 104, the system 100 of FIG. 1, or a combination thereof.

The method 1200 includes, at block 1202, obtaining, at a host controller interface (HCI), an indication that a size of a particular write buffer (WB) of a flash memory device (FMD) is to be increased, the FMD including a plurality of memory resources that include a plurality of logical units (LUs) and at least the particular WB. For example, the HCI 112 obtains an increase size indication 216 indicating that a size of a write buffer 182A of the flash memory device 104 is to be increased, as described with reference to FIGS. 2A-2C. The flash memory device 104 includes memory resources 181 that include the logical units 168 and at least the write buffer 182A.

The method 1200 also includes, at block 1204, selecting, at the HCI, a particular memory resource for write buffer reallocation based at least in part on a particular usage metric of the particular memory resource. For example, the HCI 112 selects the logical unit 168B as a particular memory resource 181 for write buffer reallocation 114 based on the logical unit usage metrics 318, as described with reference to FIGS. 3-6. As another example, the HCI 112 selects the write buffer 182B as a particular memory resource 181 for write buffer reallocation 114 based on the one or more buffer usage metrics 174, as described with reference to FIGS. 7-9.

The method 1200 thus enables dynamically increasing a size of the write buffer 182A based on usage metrics of memory resources. For example, a portion of a memory resource corresponding to low usage is reallocated to the write buffer 182A that is to be increased.

The method 1200 of FIG. 12 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1200 of FIG. 12 may be performed by a processor that executes instructions, such as described with reference to FIG. 13.

Figure 13:
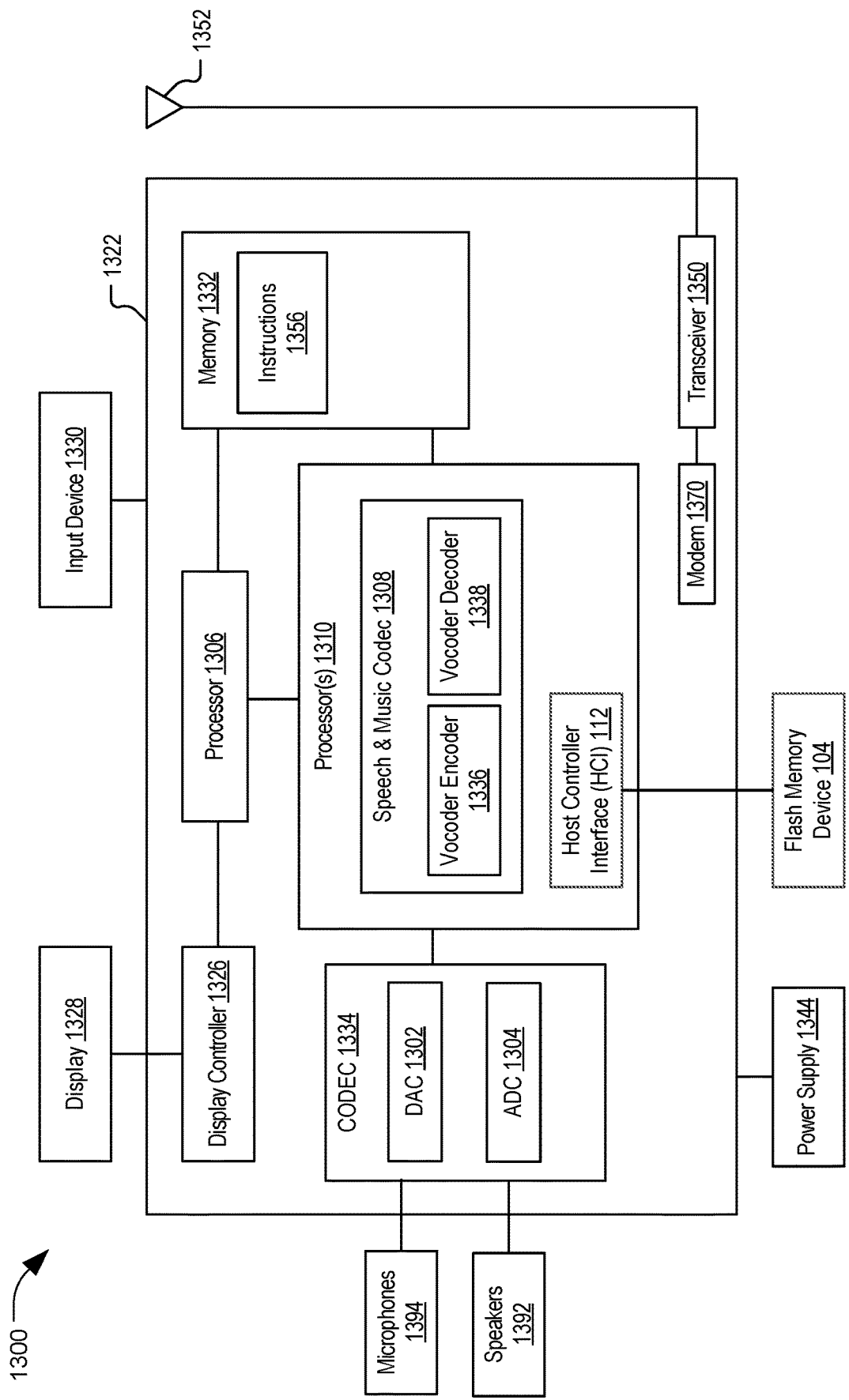
FIG. 13 is a block diagram of a particular illustrative example of a device that is operable to perform host management of write buffer size for flash memory, in accordance with some examples of the present disclosure.

Referring to FIG. 13, a block diagram of a particular illustrative example of a device is depicted and generally designated 1300. In various implementations, the device 1300 may have more or fewer components than illustrated in FIG. 13. In an illustrative implementation, the device 1300 may correspond to the host device 102. In an illustrative implementation, the device 1300 may perform one or more operations described with reference to FIGS. 1-12.

In a particular implementation, the device 1300 includes a processor 1306 (e.g., a CPU). The device 1300 may include one or more additional processors 1310 (e.g., one or more DSPs). The processors 1310 may include a speech and music coder-decoder (CODEC) 1308 that includes a voice coder ("vocoder") encoder 1336, a vocoder decoder 1338, or both. The processors 1310 may include the HCI 112 that is configured to be coupled to the flash memory device 104.

The device 1300 may include a memory 1332 and a CODEC 1334. The memory 1332 may include instructions 1356, that are executable by the one or more additional processors 1310 (or the processor 1306) to implement the functionality described with reference to the HCI 112. The device 1300 may include a modem 1370 coupled, via a transceiver 1350, to an antenna 1352.

The device 1300 may include a display 1328 coupled to a display controller 1326. One or more speakers 1392 and one or more microphones 1394 may be coupled to the CODEC 1334. The CODEC 1334 may include a digital-to-analog converter (DAC) 1302, an analog-to-digital converter (ADC) 1304, or both. In a particular implementation, the CODEC 1334 may receive analog signals from the microphone(s) 1394, convert the analog signals to digital signals using the analog-to-digital converter 1304, and provide the digital signals to the speech and music codec 1308. The speech and music codec 1308 may process the digital signals. In a particular implementation, the speech and music codec 1308 may provide digital signals to the CODEC 1334. The CODEC 1334 may convert the digital signals to analog signals using the digital-to-analog converter 1302 and may provide the analog signals to the speaker(s) 1392.

In a particular implementation, the device 1300 may be included in a system-in-package or system-on-chip device 1322. In a particular implementation, the memory 1332, the processor 1306, the processors 1310, the display controller 1326, the CODEC 1334, and the modem 1370 are included in the system-in-package or system-on-chip device 1322. In a particular implementation, an input device 1330, a power supply 1344, and the flash memory device 104 are coupled to the system-in-package or the system-on-chip device 1322. Moreover, in a particular implementation, as illustrated in FIG. 13, the display 1328, the input device 1330, the speaker(s) 1392, the microphone(s) 1394, the antenna 1352, the flash memory device 104, and the power supply 1344 are external to the system-in-package or the system-on-chip device 1322. In a particular implementation, each of the display 1328, the input device 1330, the speaker(s) 1392, the microphone(s) 1394, the antenna 1352, the flash memory device 104, and the power supply 1344 may be coupled to a component of the system-in-package or the system-on-chip device 1322, such as an interface or a controller. For example, the flash memory device 104 may be coupled to the HCI 112.

The device 1300 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for obtaining, at a host controller interface (HCI), an indication that a size of a particular write buffer (WB) of a flash memory device (FMD) is to be increased. The FMD includes a plurality of memory resources that include a plurality of logical units (LUs) and at least the particular WB. For example, the means for obtaining the indication can correspond to the HCI 112, the host device 102, the system 100 of FIG. 1, the processor 1306, the processor(s) 1310, one or more other circuits or components configured to obtain the indication, or any combination thereof.

The apparatus also includes means for selecting a particular memory resource for write buffer reallocation based at least in part on a particular usage metric of the particular memory resource for write buffer reallocation. For example, the means for selecting a particular memory resource can correspond to the HCI 112, the host device 102, the system 100 of FIG. 1, the processor 1306, the processor(s) 1310, one or more other circuits or components configured to select a particular memory resource for write buffer reallocation, or any combination thereof.

In some implementations, a non-transitory computer-readable medium (e.g., a computer-readable storage device, such as the memory 1332) includes instructions (e.g., the instructions 1356) that, when executed by one or more processors (e.g., the one or more processors 1310 or the processor 1306), cause the one or more processors to obtain, at a host controller interface (HCI) (e.g., the HCI 112), an indication (e.g., the resize indication 116A, the increase size indication 216, or both) that a size of a particular write buffer (WB) (e.g., the write buffer 182A) of a flash memory device (FMD) (e.g., the flash memory device 104) is to be increased. The FMD includes a plurality of memory resources (e.g., the memory resources 181) that include a plurality of logical units (LUs) (e.g., the logical units 168) and at least the particular WB. The instruction further cause the one or more processors to select a particular memory resource (e.g., a logical unit 168B or a write buffer 182B) for write buffer reallocation (e.g., write buffer reallocation 114) based at least in part on a particular usage metric (e.g., the resize metric 320B or the buffer usage metric 174B) of the particular memory resource.

Particular Aspects of the Disclosure are Described Below in Sets of Interrelated Examples:

According to Example 1, a host device includes a host controller interface (HCI) configured to be coupled to a flash memory device (FMD) and configured to obtain an indication that a size of a particular write buffer (WB) of the FMD is to be increased, the FMD including a plurality of memory resources that include a plurality of logical units (LUs) and at least the particular WB; and select a particular memory resource for write buffer reallocation based at least in part on a particular usage metric of the particular memory resource.

Example 2 includes the host device of Example 1, wherein the HCI is configured to, based on obtaining the indication: obtain usage metrics of the plurality of LUs; select, based on the usage metrics, a particular LU as the particular memory resource for write buffer allocation; and reallocate a portion of the particular LU to the particular WB.

Example 3 includes the host device of Example 1 or Example 2, wherein the HCI is configured to reallocate the portion of the particular LU including triple level cell (TLC) memory to the particular WB including single level cell (SLC) memory.

Example 4 includes the host device of Example 2 or Example 3, wherein the HCI is configured to maintain the usage metrics during operation of the FMD, and wherein the usage metrics include utilization metrics, availability metrics, or both, of the plurality of LUs.

Example 5 includes the host device of any of Examples 2 to 4, wherein the HCI is configured to generate resize metrics of the plurality of LUs based on the usage metrics; and select the particular LU having a particular resize metric indicative of lowest usage among the plurality of LUs.

Example 6 includes the host device of Example 5, wherein the particular resize metric is based on an availability metric, a utilization metric, or both, of the particular LU.

Example 7 includes the host device of Example 6, wherein the availability metric corresponds to unused storage capacity of the particular LU.

Example 8 includes the host device of Example 6 or Example 7, wherein the utilization metric is based on a count of data accesses at the particular LU.

Example 9 includes the host device of any of Examples 6 to 8, wherein the particular resize metric corresponds to a weighted sum of the availability metric and the utilization metric.

Example 10 includes the host device of Example 1, wherein the HCI is configured to, based on obtaining the indication: obtain buffer usage metrics of a plurality of WBs of the FMD, wherein the buffer usage metrics are maintained at the FMD; select, based on the buffer usage metrics, a first WB as the particular memory resource for write buffer allocation; and reallocate a portion of the first WB to the particular WB.

Example 11 includes the host device of Example 10, wherein the HCI is configured to select the first WB having a first buffer usage metric indicative of lowest usage among the plurality of WBs.

Example 12 includes the host device of Example 11, wherein the first buffer usage metric indicates a count of full buffer detections of the first WB.

Example 13 includes the host device of any of Examples 1 to 12, wherein the HCI is configured to, based on obtaining a second indication that a size of a second particular WB is to be decreased, deallocate a portion of the second particular WB.

Example 14 includes the host device of any of Examples 1 to 13, wherein the HCI is configured to obtain the indication based on a comparison of a buffer usage metric of the particular WB to one or more thresholds.

Example 15 includes the host device of Example 14, wherein the buffer usage metric includes a count of full buffer detections of the particular WB.

Example 16 includes the host device of Example 14 or Example 15, wherein the one or more thresholds include an upper limit, a lower limit, or both.

Example 17 includes the host device of any of Examples 1 to 16, wherein the HCI is configured to send a buffer usage request to the FMD; receive a buffer usage metric of the particular WB from the FMD responsive to the buffer usage request; and generate the indication based on a comparison, at the HCI, of the buffer usage metric to one or more thresholds.

Example 18 includes the host device of Example 17, wherein the buffer usage request includes a write booster buffer full count ALL READ instruction to retrieve buffer usage metrics of each WB of the FMD.

Example 19 includes the host device of any of Examples 1 to 16, wherein the HCI is configured to obtain the indication based on an exception that is triggered based on a comparison, at the FMD, of a buffer usage metric of the particular WB buffer to one or more thresholds.

Example 20 includes the host device of Example 19, wherein the one or more thresholds are stored at a register of the FMD.

According to Example 21, a method includes obtaining, at a host controller interface (HCI), an indication that a size of a particular write buffer (WB) of a flash memory device (FMD) is to be increased, the FMD including a plurality of memory resources that include a plurality of logical units (LUs) and at least the particular WB; and selecting, at the HCI, a particular memory resource for write buffer reallocation based at least in part on a particular usage metric of the particular memory resource.

Example 22 includes the method of Example 21, further comprising, based on obtaining the indication: obtaining usage metrics of the plurality of LUs; selecting, based on the usage metrics, a particular LU as the particular memory resource for write buffer allocation; and reallocating a portion of the particular LU to the particular WB.

Example 23 includes the method of Example 21 or Example 22, wherein the portion of the particular LU includes triple level cell (TLC) memory and wherein the particular WB includes single level cell (SLC) memory.

Example 24 includes the method of Example 22 or Example 23 and further includes maintaining the usage metrics during operation of the FMD, wherein the usage metrics include utilization metrics, availability metrics, or both, of the plurality of LUs.

Example 25 includes the method of any of Examples 22 to 24 and further includes generating resize metrics of the plurality of LUs based on the usage metrics, wherein the particular LU is selected based on determining that the particular LU has a particular resize metric indicative of lowest usage among the plurality of LUs.

Example 26 includes the method of Example 25, wherein the particular resize metric is based on an availability metric, a utilization metric, or both, of the particular LU.

Example 27 includes the method of Example 26, wherein the availability metric corresponds to unused storage capacity of the particular LU.

Example 28 includes the method of Example 26 or Example 27, wherein the utilization metric is based on a count of data accesses at the particular LU.

Example 29 includes the method of any of Examples 26 to 28, wherein the particular resize metric corresponds to a weighted sum of the availability metric and the utilization metric.

Example 30 includes the method of Example 21 and further includes, based on obtaining the indication: obtaining buffer usage metrics of a plurality of WBs of the FMD, wherein the buffer usage metrics are maintained at the FMD; selecting, based on the buffer usage metrics, a first WB as the particular memory resource for write buffer allocation; and reallocating a portion of the first WB to the particular WB.

Example 31 includes the method of Example 30, wherein the first WB is selected based on determining that the first WB has a first buffer usage metric indicative of lowest usage among the plurality of WBs.

Example 32 includes the method of Example 31, wherein the first buffer usage metric indicates a count of full buffer detections of the first WB.

Example 33 includes the method of any of Examples 21 to 32 and further includes, based on obtaining a second indication that a size of a second particular WB is to be decreased, deallocating a portion of the second particular WB.

Example 34 includes the method of any of Examples 21 to 33, wherein the indication is based on a comparison of a buffer usage metric of the particular WB to one or more thresholds.

Example 35 includes the method of Example 34, wherein the buffer usage metric includes a count of full buffer detections of the particular WB.

Example 36 includes the method of Example 34 or Example 35, wherein the one or more thresholds include an upper limit, a lower limit, or both.

Example 37 includes the method of any of Examples 21 to 36 and further includes sending a buffer usage request from the HCI to the FMD; receiving, at the HCI from the FMD, a buffer usage metric of the particular WB responsive to the buffer usage request; and generating the indication based on a comparison, at the HCI, of the buffer usage metric to one or more thresholds.

Example 38 includes the method of Example 37, wherein the buffer usage request includes a write booster buffer full count ALL READ instruction to retrieve buffer usage metrics of each WB of the FMD.

Example 39 includes the method of any of Examples 21 to 36, wherein the indication is obtained based on an exception that is triggered based on a comparison, at the FMD, of a buffer usage metric of the particular WB buffer to one or more thresholds.

Example 40 includes the method of Example 39, wherein the one or more thresholds are stored at a register of the FMD.

According to Example 41, a device includes: a memory configured to store instructions; and a processor configured to execute the instructions to perform the method of any of Examples 21 to 40.

According to Example 42, a non-transitory computer-readable medium stores instructions that, when executed by a processor, cause the processor to perform the method of any of Examples 21 to 40.

According to Example 43, an apparatus includes means for carrying out the method of any of Examples 21 to 40.

According to Example 44, a non-transitory computer readable medium storing instructions that, when executed by one or more processors, cause the one or more processors to obtain, at a host controller interface (HCI), an indication that a size of a particular write buffer (WB) of a flash memory device (FMD) is to be increased, the FMD including a plurality of memory resources that include a plurality of logical units (LUs) and at least the particular WB; and select a particular memory resource for write buffer reallocation based at least in part on a particular usage metric of the particular memory resource.

According to Example 45, an apparatus includes means for obtaining, at a host controller interface (HCI), an indication that a size of a particular write buffer (WB) of a flash memory device (FMD) is to be increased, the FMD including a plurality of memory resources that include a plurality of logical units (LUs) and at least the particular WB; and means for selecting a particular memory resource for write buffer reallocation based at least in part on a particular usage metric of the particular memory resource.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A host device comprising:
 a host controller interface (HCI) configured to be coupled to a flash memory device (FMD) and configured to:
  obtain an indication that a size of a particular write buffer (WB) of the FMD is to be increased, the FMD including a plurality of memory resources that include a plurality of logical units (LUs) and at least the particular WB;
  obtain usage metrics of the plurality of LUs;
  select, based on the usage metrics, a particular LU as a particular memory resource for write buffer allocation; and
  reallocate a portion of the particular LU to the particular WB.

2. The host device of claim 1, wherein the HCI is configured to reallocate the portion of the particular LU including triple level cell (TLC) memory to the particular WB including single level cell (SLC) memory.

3. The host device of claim 1, wherein the HCI is configured to maintain the usage metrics during operation of the FMD, and wherein the usage metrics include utilization metrics, availability metrics, or both, of the plurality of LUs.

4. The host device of claim 1, wherein the HCI is configured to:
 generate resize metrics of the plurality of LUs based on the usage metrics; and
 select the particular LU having a particular resize metric indicative of lowest usage among the plurality of LUs.

5. The host device of claim 4, wherein the particular resize metric is based on an availability metric, a utilization metric, or both, of the particular LU.

6. The host device of claim 5, wherein the availability metric corresponds to unused storage capacity of the particular LU.

7. The host device of claim 5, wherein the utilization metric is based on a count of data accesses at the particular LU.

8. The host device of claim 5, wherein the particular resize metric corresponds to a weighted sum of the availability metric and the utilization metric.

9. The host device of claim 1, wherein the HCI is configured to, based on obtaining the indication:
 obtain buffer usage metrics of a plurality of WBs of the FMD, wherein the buffer usage metrics are maintained at the FMD;
 select, based on the buffer usage metrics, a first WB as the particular memory resource for write buffer allocation; and
 reallocate a portion of the first WB to the particular WB.

10. The host device of claim 9, wherein the HCI is configured to select the first WB having a first buffer usage metric indicative of lowest usage among the plurality of WBs.

11. The host device of claim 10, wherein the first buffer usage metric indicates a count of full buffer detections of the first WB.

12. The host device of claim 1, wherein the HCI is configured to, based on obtaining a second indication that a size of a second particular WB is to be decreased, deallocate a portion of the second particular WB.

13. The host device of claim 1, wherein the HCI is configured to obtain the indication based on a comparison of a buffer usage metric of the particular WB to one or more thresholds.

14. The host device of claim 13, wherein the buffer usage metric includes a count of full buffer detections of the particular WB.

15. The host device of claim 13, wherein the one or more thresholds include an upper limit, a lower limit, or both.

16. The host device of claim 1, wherein the HCI is configured to:
 send a buffer usage request to the FMD;
 receive a buffer usage metric of the particular WB from the FMD responsive to the buffer usage request; and
 generate the indication based on a comparison, at the HCI, of the buffer usage metric to one or more thresholds.

17. The host device of claim 16, wherein the buffer usage request includes a write booster buffer full count ALL READ instruction to retrieve buffer usage metrics of each WB of the FMD.

18. The host device of claim 1, wherein the HCI is configured to obtain the indication based on an exception that is triggered based on a comparison, at the FMD, of a buffer usage metric of the particular WB buffer to one or more thresholds.

19. The host device of claim 18, wherein the one or more thresholds are stored at a register of the FMD.

20. A method comprising:
  obtaining, at a host controller interface (HCI), an indication that a size of a particular write buffer (WB) of a flash memory device (FMD) is to be increased, the FMD including a plurality of memory resources that include a plurality of logical units (LUs) and at least the particular WB;
  obtaining usage metrics of the plurality of LUs;
  selecting, based on the usage metrics, a particular LU as a particular memory resource for write buffer allocation; and
  reallocating a portion of the particular LU to the particular WB.

21. The method of claim 20, wherein the portion of the particular LU includes triple level cell (TLC) memory and wherein the particular WB includes single level cell (SLC) memory.

22. The method of claim 20, further comprising maintaining the usage metrics during operation of the FMD, wherein the usage metrics include utilization metrics, availability metrics, or both, of the plurality of LUs.

23. The method of claim 20, further comprising generating resize metrics of the plurality of LUs based on the usage metrics, wherein the particular LU is selected based on determining that the particular LU has a particular resize metric indicative of lowest usage among the plurality of LUs.

24. The method of claim 23, wherein the particular resize metric is based on an availability metric, a utilization metric, or both, of the particular LU.

25. The method of claim 24, wherein the availability metric corresponds to unused storage capacity of the particular LU.

26. The method of claim 24, wherein the utilization metric is based on a count of data accesses at the particular LU.

27. A non-transitory computer readable medium storing instructions that, when executed by one or more processors, cause the one or more processors to:
  obtain, at a host controller interface (HCI), an indication that a size of a particular write buffer (WB) of a flash memory device (FMD) is to be increased, the FMD including a plurality of memory resources that include a plurality of logical units (LUs) and at least the particular WB, wherein the HCI is configured to obtain the indication based on a comparison of a buffer usage metric of the particular WB to one or more thresholds; and
  select a particular memory resource for write buffer reallocation based at least in part on a particular usage metric of the particular memory resource.

28. An apparatus comprising:
  means for obtaining, at a host controller interface (HCI), an indication that a size of a particular write buffer (WB) of a flash memory device (FMD) is to be increased, the FMD including a plurality of memory resources that include a plurality of logical units (LUs) and at least the particular WB, wherein the HCI is configured to obtain the indication based on a comparison of a buffer usage metric of the particular WB to one or more thresholds; and
  means for selecting a particular memory resource for write buffer reallocation based at least in part on a particular usage metric of the particular memory resource.

* * * * *